(12) United States Patent
Nishikawa et al.

(10) Patent No.: US 6,375,891 B1
(45) Date of Patent: Apr. 23, 2002

(54) METHOD OF MANUFACTURING A RESINOUS TANK

(75) Inventors: Makoto Nishikawa; Akihiko Natsume, both of Toyohashi; Kouichi Jinno, Hamamatsu, all of (JP)

(73) Assignee: Asmo Co., Ltd. (JP)

( * ) Notice: Subject to any disclaimer, the term of this patent is extended or adjusted under 35 U.S.C. 154(b) by 0 days.

(21) Appl. No.: 09/114,322

(22) Filed: Jul. 13, 1998

(30) Foreign Application Priority Data

Jul. 18, 1997 (JP) ............................................. 9-194024
Dec. 17, 1997 (JP) ............................................. 9-347776

(51) Int. Cl.⁷ ............................................. B29C 49/50
(52) U.S. Cl. .................... 264/534; 264/531; 264/536; 264/540; 264/155; 425/533; 425/577
(58) Field of Search .................... 264/504, 531, 264/534, 536, 540, 155; 425/536, 577, 533

(56) References Cited

U.S. PATENT DOCUMENTS

| 2,468,760 | A | * | 3/1949 | Kempthorn | ................. 425/536 |
| 3,167,817 | A | * | 2/1965 | Zalkind | ................. 264/536 |
| 3,821,344 | A | | 6/1974 | Peters | |
| 3,844,698 | A | * | 10/1974 | Zanca | ................. 425/528 |
| 4,025,276 | A | * | 5/1977 | Peters | ................. 425/536 |
| 4,277,300 | A | * | 7/1981 | Taluba et al. | ........... 156/244.14 |
| 5,181,838 | A | * | 1/1993 | Sato et al. | ................. 417/360 |
| 5,219,422 | A | * | 6/1993 | Sato | ................. 417/360 |
| 5,863,489 | A | * | 1/1999 | Flood et al. | ................. 264/504 |
| 5,989,482 | A | * | 11/1999 | Sagawa | ................. 264/515 |

FOREIGN PATENT DOCUMENTS

| JP | 58-222823 | * | 12/1983 | ................. 264/531 |
| JP | 62-9944 | | 1/1987 | |
| JP | 63-37543 | | 3/1988 | |
| JP | 3-69457 | * | 3/1991 | |
| JP | 76808 Abstract | * | 12/1991 | |
| JP | 3-76808 | | 12/1991 | |
| JP | 07-214652 | | 8/1995 | |
| JP | 10-128838 | | 5/1998 | |

OTHER PUBLICATIONS

Derwent abstract 1990–379939 for Japanese 2274525, Apr. 1989.*
Japanese Office Action for Appln. No. 9–194024 and English Translation, Feb. 2, 2001.

* cited by examiner

Primary Examiner—Suzanne E. McDowell
(74) Attorney, Agent, or Firm—Parkhurst & Wendel, L.L.P

(57) ABSTRACT

A tool with a blade is provided at a molding die and set so as to protrude further inwardly than the molding surface of the molding die. When a parison is expanded within the molding dies, the parison is brought into close contact with the outer peripheral wall of the tool. A hollow body is formed in a state in which the inner wall surface of a through-hole is molded by the outer peripheral wall of the tool. Thereafter, the tool is advanced and a cut-out piece is excised. A washer tank is thereby formed. The inner wall surface of the through-hole is not a cut surface and the through-hole is formed in accordance with the outer peripheral wall of the tool.

29 Claims, 34 Drawing Sheets

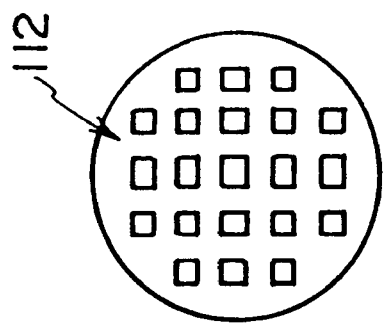
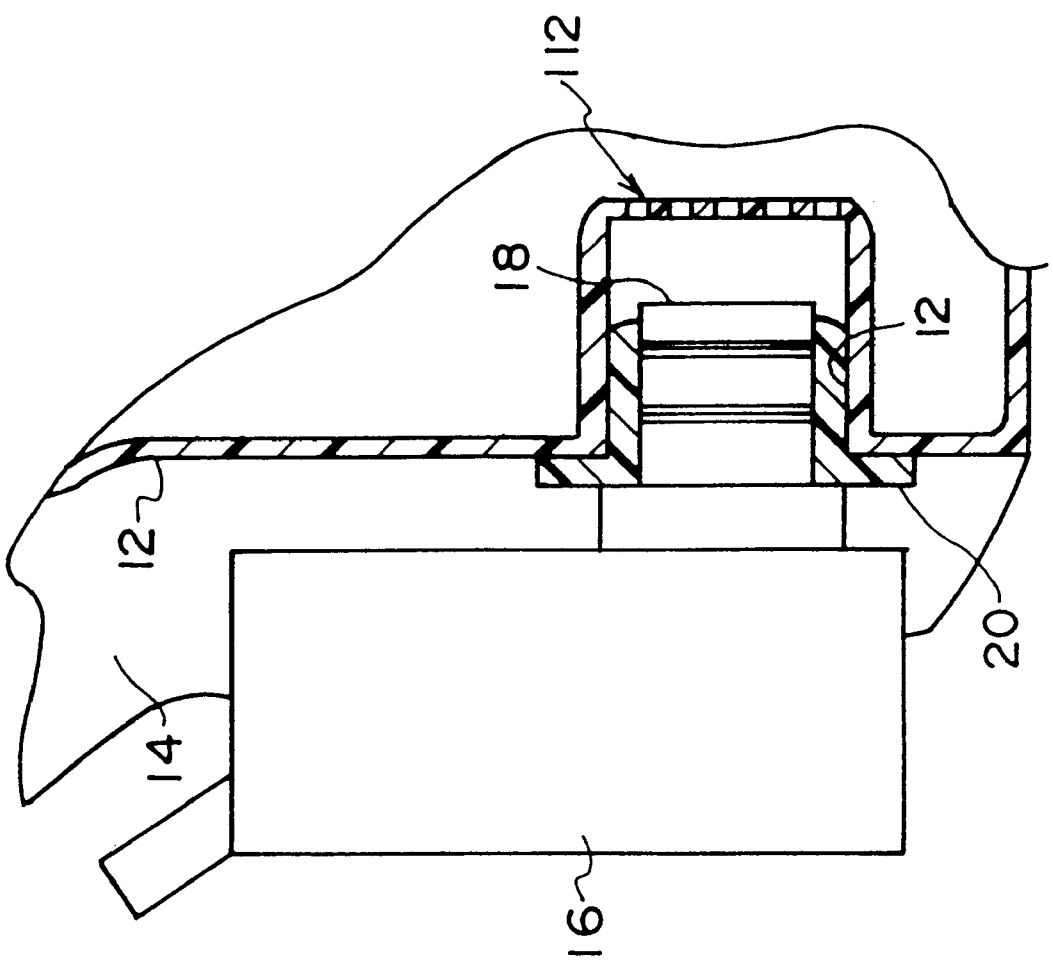
FIG.33B
FIG.33A

METHOD OF MANUFACTURING A RESINOUS TANK

BACKGROUND OF THE INVENTION

1. Field of the Invention

The present invention relates to a method of manufacturing a resinous tank in which a through-hole is provided at a side wall portion thereof, and more particularly to a method of manufacturing a resinous tank to which blow molding is applied.

2. Description of the Related Art

As a resinous tank manufactured through blow molding, for example, a washer tank which is applied to a wiper device of a vehicle and contains solutions such as a window washer solution or the like is known.

In this type of washer tank, as shown in FIG. 36, a through-hole 82 for supplying water is formed at the side wall portion of a tank 80. Further, in the vicinity of the through-hole 82, in general, a pump 84 for supplying water is attached to the tank 80 itself. An inlet 86 of the pump 84 is fit the through-hole 82 via a grommet 88. In this way, sealability around the through-hole 82 is guaranteed. When the pump 84 is operated, a washer solution within the tank 80 is absorbed by the pump 84 and discharged from an outlet 90.

As mentioned above, the grommet 88 is interposed between the through-hole 82 of the tank 80 and the inlet 86 of the pump 84 in such a way that the sealability of the through-hole 82 is guaranteed. However, in order to guarantee the sealability, good surface roughness is required at the inner circumferential wall (the surface of the through-hole 82 to which the grommet 88 is adhered) of the through-hole 82. In other words, when the surface roughness of the inner circumferential wall of the through-hole 82 is poor, the adhesion of the through-hole 82 to the grommet 88 deteriorates. As a result, the sealability becomes poor.

Conventionally, the main body portion (the hollow body) of the tank 80 is molded through blow molding, and thereafter, is machined by tools such as a drill or the like. The through-hole 82 is formed and the surface roughness of the seal surface (the inner circumferential wall portion of the through-hole 82) is guaranteed. Therefore, the number of manufacturing processes, the time to manufacture the product, and the cost of manufacturing are increased.

As a result, a manufacturing technique has been proposed in which subsequent machining which uses tools such as a drill or the like is not required, and when the tank 80 is molded through blow molding, the through-hole 82 can be also formed (Japanese Patent Application Publication (JP-B) No. 3-76808).

In accordance with the manufacturing technique described in JP-B No. 3-76808, a tool with a blade which forms a cavity is provided further outwardly than the molding surface (the cavity) of the molding die, a parison is expanded and a hollow body is formed, and thereafter, the side wall portion of the hollow body is cut out (punched) so as to form the through-hole 82. In accordance with this manufacturing technique, after the tank 80 (the hollow body) is molded through blow molding, there is no need to implement subsequent machining which uses tools such as a drill or the like and the tank 80 can be formed at one manufacturing process.

However, in the manufacturing technique described in JP-B No. 3-76808, since the side wall portion of the hollow body is cut out (punched) by the tool with a blade so as to form the through-hole 82, the inner circumferential wall portion (the seal surface) of the through-hole 82 forms a cut surface. Therefore, the surface roughness of the inner circumferential wall portion (the seal surface) is poor (necessary surface roughness cannot be guaranteed), and as a result, the sealability is likely to be poor. Consequently, the tank 80 which is manufactured in accordance with the manufacturing technique described in JP-B No. 3-76808 cannot be applied to a vehicle washer tank or the like.

SUMMARY OF THE INVENTION

With the aforementioned in view, an object of the present invention is to obtain a method of manufacturing a resinous tank in which the surface roughness of the seal surface of a through-hole can be made good and this can be realized at a low cost without requiring complicated machining.

A first aspect of the present invention is a method of manufacturing a resinous tank having a through-hole provided at a side wall portion of the tank, comprising the steps of: providing a tool with a blade at one of molding dies beforehand such that a portion of the tool protrudes further inwardly than the molding surface of the one of the molding dies, the tool being columnar and the blade being provided at a distal end of the tool; forming a hollow body by expanding a resin parison within the molding die such that the resin parison is pressed against inner wall surfaces of the molding dies and brought into close contact with the outer peripheral wall of the tool, protruding the blade of the tool further inwardly than the thickness of a general portion (a portion not provided the tool) of the pressed resin parison such that the outer peripheral wall of the tool forms an inner wall surface of the through-hole; completing formation of the through-hole by advancing the tool further into the hollow body, and cutting out a portion of the resin parison hollow body which portion corresponds to the blade of the tool; and removing the tool from the hollow body, opening the molding dies, and removing the hollow body in which the through-hole has been formed.

In the method of manufacturing a resinous tank relating to the first aspect of the present invention, the tool is provided at the molding die beforehand such that the portion of the tool protrudes further inwardly than the molding surface of the molding die. Since the resin parison is expanded within the molding dies, the parison is pressed against inner wall surfaces of the molding dies and brought into close contact with the outer peripheral wall of the tool.

In this state, the blade of the tool protrudes further inwardly than the thickness of the general portion of the pressed resin parison such that the outer peripheral wall of the tool forms an inner wall surface of the through-hole. The hollow body is thereby formed.

Next, when the tool is advanced further into the hollow body, the resin parison hollow body which portion corresponds to the blade of the tool is cut out and the through-hole is formed. Further, the tool is removed from the hollow body, the molding dies are opened, and the hollow body is removed in which the through-hole has been formed. Consequently, the resinous tank is manufactured.

In accordance with a method of manufacturing a resinous tank relating to the first aspect of the present invention, the resin parison is expanded within the molding dies and brought into close contact with the outer peripheral wall of the tool. In this way, the through-hole is formed. Namely, because the inner wall surface of the through-hole is not a cut surface and is formed in accordance with the outer peripheral wall of the tool (because the outer peripheral wall of the tool is the inner wall surface of the through-hole), the surface roughness of the inner wall portion (the seal surface) can be good (the necessary surface roughness can be maintained). Accordingly, the sealability of the through-hole can be guaranteed and the tank can be suitably used for, for example, a vehicle washer tank or the like.

A second aspect of the present invention is a method of manufacturing a resinous tank having a through-hole provided at a side wall portion of the tank, comprising the steps of: providing a convex portion at one of molding dies beforehand such that the convex portion protrudes further inwardly than the molding surface of one of the molding dies, the convex portion being cylindrical so as to correspond to a through-hole to be formed; disposing a tool with a blade, the tool being columnar and the blade being provided at the distal end of the tool within the cylindrical convex portion; forming a hollow body by expanding a resin parison within the molding dies such that the resin parison is pressed against the inner wall surfaces of the molding dies and brought into close contact with a peripheral wall of the convex portion, and molding the inner wall surface of the through-hole by the peripheral wall of the convex portion; completing formation of the through-hole by advancing the tool further into the hollow body and cutting out a portion of the resin parison hollow body which portion corresponds to the blade of the tool, and removing the tool from the hollow body, opening the molding dies, and removing the hollow body in which the through-hole has been formed.

In the method of manufacturing a resinous tank according to the second aspect of the present invention, the convex portion, which is formed cylindrical so as to correspond to a through-hole of the tank, is provided at the molding die beforehand such that the convex portion protrudes further inwardly than the molding surface of the molding die. Further, the tool is disposed within the cylindrical convex portion.

As the resin parison is expanded within the molding dies, the parison is pressed against the inner wall surfaces of the molding dies and brought into close contact with a peripheral wall of the convex portion. In this way, the hollow body is formed in a state in which the inner wall surface of the through-hole is molded by the peripheral wall of the convex portion.

Next, when the tool disposed within the convex portion is advanced further into the hollow body, a portion of the resin parison hollow body which portion corresponds to the blade of the tool is cut out, and the through-hole is formed. Further, the tool is removed from the hollow body, the molding dies are opened, and the hollow body is removed in which the through-hole has been formed. The resinous tank is thereby manufactured.

In accordance with the method of manufacturing a resinous tank according to the second aspect of the present invention, the resin parison is expanded within the molding dies and brought into close contact with the peripheral wall of the convex portion. In this way, the through-hole is formed. Namely, because the inner wall surface of the through-hole is not a cut surface and is formed in accordance with the peripheral wall of the cylindrical convex portion (because the peripheral wall of the convex portion is the inner wall surface of the through-hole), the surface roughness of the inner wall portion (the seal surface) can be good (the necessary surface roughness can be maintained). Further, providing the convex portion at one of molding dies, the seal surface is not apt to be influenced by the shock of cutting out the portion of the resin parison hollow body. Accordingly, the sealability of the through-hole can be guaranteed and the tank can be suitably used for, for example, a vehicle washer tank or the like.

Further, in the method of manufacturing a resinous tank according to the first and second aspects of the present invention, unlike the conventional example, the through-hole is not formed through subsequent machining using tools such as a drill or the like and can be formed at the same time that the hollow body is molded through blow molding. The resinous tank provided with the through-hole can be formed at one manufacturing process and the cost can be reduced.

In this way, in the method of manufacturing a resinous tank according to the first and second aspects of the present invention, the seal surface of the through-hole can be formed with good surface roughness and this can be realized at a low cost without requiring complicated machining.

A third aspect of the present invention is a method of manufacturing a resinous tank according to the second aspect of the present invention, wherein a heater is provided at the blade of the tool, and when a portion of the resin parison hollow body which portion corresponds to the blade is cut out by the blade, the portion is cut out while being melted by the heater.

In the method of manufacturing a resinous tank according to the third aspect of the present invention, when a portion of the resin parison of the hollow body which corresponds to the blade is cut out by the blade, the portion is cut out while being heated and melted by the heater which is provided at the blade.

As a result, when the tool is advanced further into the hollow body so as to cut out the portion of the resin parison hollow body and to form the through-hole, there is no need to apply large pressing force to the cut-out portion of the resin parison. Accordingly, the hollow body (the general portion of the resin parison) is not shifted and moved unnecessarily due to the movement of the tool with a blade, and the resin parison corresponding to the through-hole can be cut out reliably. As a result, the product accuracy further improves. In addition to this, the through-hole can be easily formed even where the holding force of the hollow body (the general portion of the resin parison) by the molding die is low (in other words, the molding dies can be set regardless of the position at which the through-hole is formed), and the degree of freedom in design and the range of application increases.

A fourth aspect of the present invention is a method of manufacturing a resinous tank according to the first and second aspects of the present invention, further comprising the steps of: when the portion of the resin parison hollow body which portion corresponds to the blade is cut out by the blade, having the blade of the tool retain a cut-out piece; and when the tool is removed from the hollow body, removing the cut-out piece along with the tool.

In the method of manufacturing a resinous relating to the fourth aspect of the present invention, when the portion of the resin parison hollow body which portion corresponds to the blade is cut out by the blade, the cut-out piece is retained by the blade of the tool, and further, when the tool is removed from the hollow body, the cut-out piece is removed from the hollow body along with the tool.

Accordingly, the cut-out piece of the resin parison does not drop and remain inside the hollow body. As a result, after the molding dies are opened and the hollow body is removed, there is no need to take out the remaining cut-out piece later, and the processes and the cost can be reduced.

A fifth aspect of the present invention is a method of manufacturing a resinous tank according to the first, second, or fourth aspect of the present invention, wherein the tool or the convex portion is provided in a vicinity of a position of the die-matching portion of a pair of male and female segmental molding dies so as to mold the through-hole.

In the method of manufacturing a resinous tank according to the fifth aspect of the present invention, the tool or the convex portion is provided in a vicinity of a position of the die-matching portion of the pair of male and female segmental molding dies so as to mold the through-hole.

In the die-matching portion of the molding dies, the resin parison (the portion of the resin parison other than the one used for forming the resinous tank) is nipped and held. Accordingly, when the tool or the tool disposed within the convex portion is advanced further into the hollow body so as to cut out the portion of the resin parison hollow body and form the through-hole, the hollow body (the general portion of the resin parison) is not shifted or moved unnecessarily due to the movement of the tool. The portion of the resin parison corresponding to the through-hole can be cut out reliably. As a result, the product accuracy further improves.

A sixth aspect of the present invention is a method of manufacturing a resinous tank according to any of the first through fifth aspects of the present invention, wherein a cavity of the molding dies is formed such that an undercut portion is molded at the hollow body, and the tool or the convex portion is provided in a vicinity of the region at which the undercut portion is to be formed.

In the method of manufacturing a resinous tank according to the sixth aspect of the present invention, the cavity of the molding dies is formed go as to mold the undercut portion at the hollow body. The tool or the convex portion is provided in the vicinity of the region at which the undercut portion of the hollow body is to be formed.

It is, of course, difficult to remove the undercut portion of the hollow body from the molding dies. In other words, the hollow body is reliably held at the molding dies. Accordingly, when the tool or the tool disposed within the convex portion is advanced further into the hollow body so as to cut out the portion of the resin parison hollow body and form the through-hole, the hollow body (the general portion of the resin parison) is not shifted or moved unnecessarily due to the movement of the tool, and the portion of the resin parison corresponding to the through-hole can be cut out reliably. As a result, the product accuracy further improves.

A seventh aspect of the present invention is a method of manufacturing a resinous tank according to the first and second aspects of the present invention, the length of a portion of the tool which protrudes beforehand further inwardly than the molding surface of one of the molding dies is equal to or more than the thickness of the general portion of the pressed resin parison so that the thickness of the resin parison on the blade is reduced. Accordingly, it is easy to cut out the portion of the resin parison hollow body and the seal surface is not apt to be influenced by the shock of cutting out the portion of the resin parison hollow body.

A eighth aspect of the present invention is a method of manufacturing a resinous tank according to the seventh aspects of the present invention, the blade is concave-shaped or convex-shaped so that the thickness of the resin parison on the blade is further reduced. Accordingly, it is easy to cut out the portion of the resin parison hollow body and the seal surface is not apt to be influenced by the shock of cutting out the portion of the resin parison hollow body.

BRIEF DESCRIPTION OF THE DRAWINGS

FIG. 33A is a cross-sectional view of a washer tank which is manufactured in accordance with the method of manufacturing a resinous tank relating to the ninth embodiment of the present invention.

FIG. 33B is an elevational view of a filter portion of the washer tank which is manufactured in accordance with the method of manufacturing a resinous tank relating to the ninth embodiment of the present invention.

DESCRIPTION OF THE PREFERRED EMBODIMENTS

Figure 8:
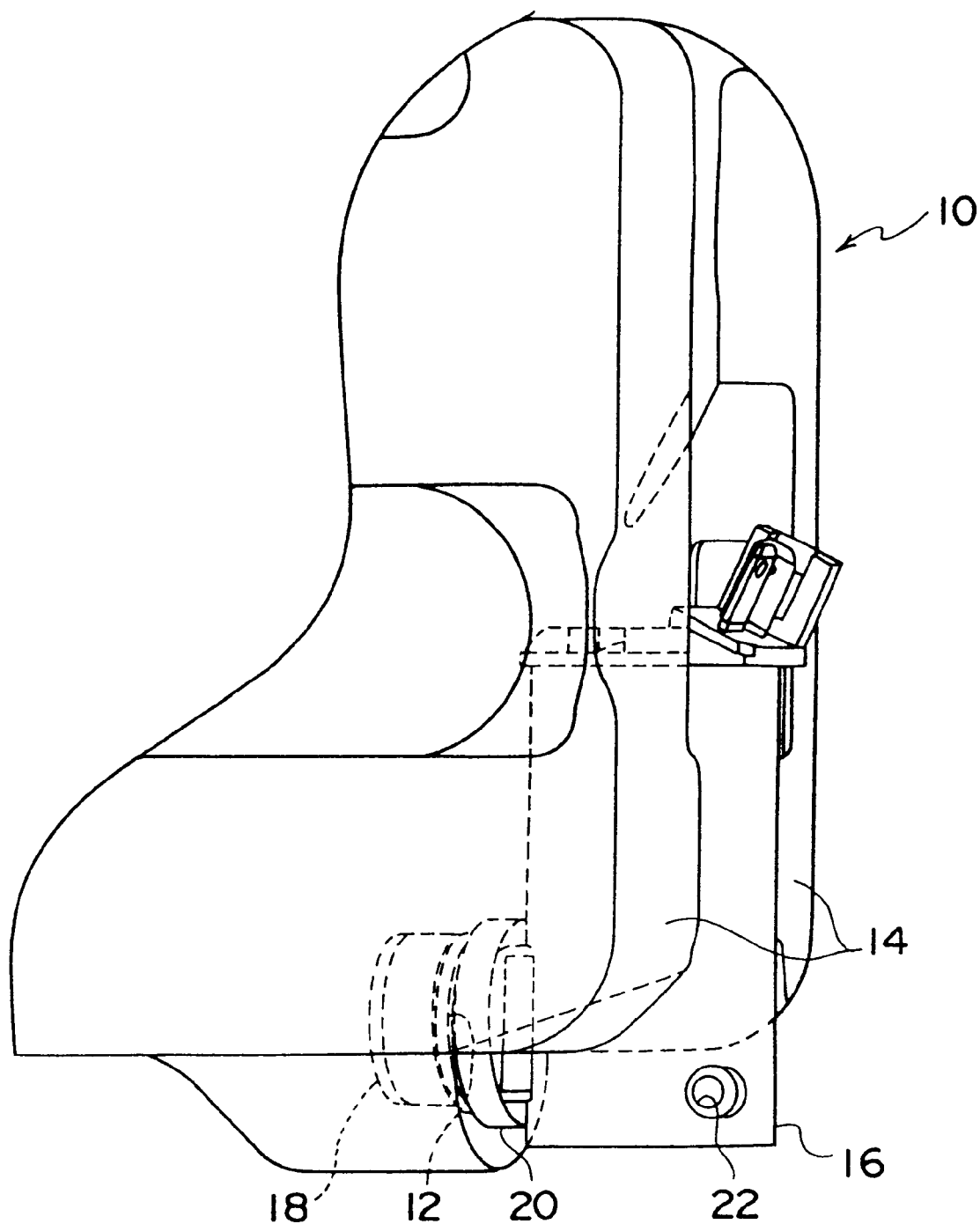
FIG. 8 is an elevational view which shows the principal portion of a washer tank which is manufactured using the method of manufacturing a resinous tank relating to the first and second embodiments of the present invention.
Figure 9:
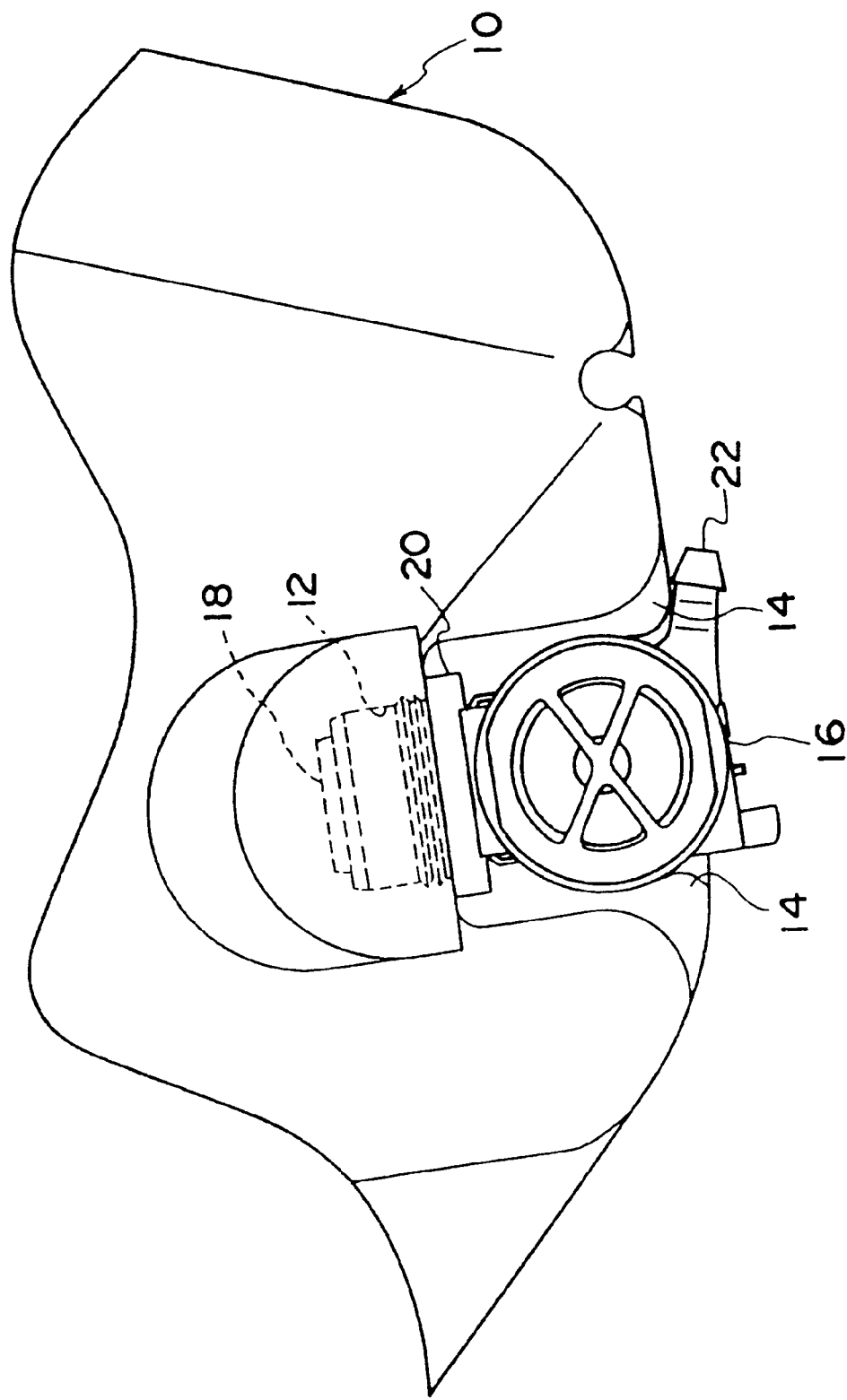
FIG. 9 is a bottom view which shows the principal portion of the washer tank which is manufactured using the method of manufacturing a resinous tank relating to the first and second embodiments of the present invention.

FIG. 8 shows an elevational view of a structure of a principal portion of a washer tank 10, which serves as a resinous tank and is manufactured using a method of manufacturing a resinous tank relating to first or second embodiment of the present invention. Further, FIG. 9 shows a bottom view of a structure of a principal portion of the washer tank 10.

The washer tank 10, for example, is applied to a wiper device of a vehicle and can contain solutions such as a window washer solution or the like.

A through-hole 12 for supplying water is formed at a side wall portion of the washer tank 10. Moreover, a pair of pump fitting portions 14 are formed in opposition to each other at the side wall portion in the vicinity of the through-hole 12. These pump fitting portions 14, which will be described later, are formed as an undercut portion at the time of manufacturing the washer tank 10 through blow molding. A pump 16 for supplying water is fitted into and attached to the pump fitting portions 14. An inlet 18 of the pump 16 is fitted the through-hole 12 via a grommet 20. In this way, the sealability around the through-hole 12 is guaranteed. When the pump 16 is operated, a washer solution within the washer tank 10 is sucked by the pump 16 and discharged from an outlet 22.

Figure 1:
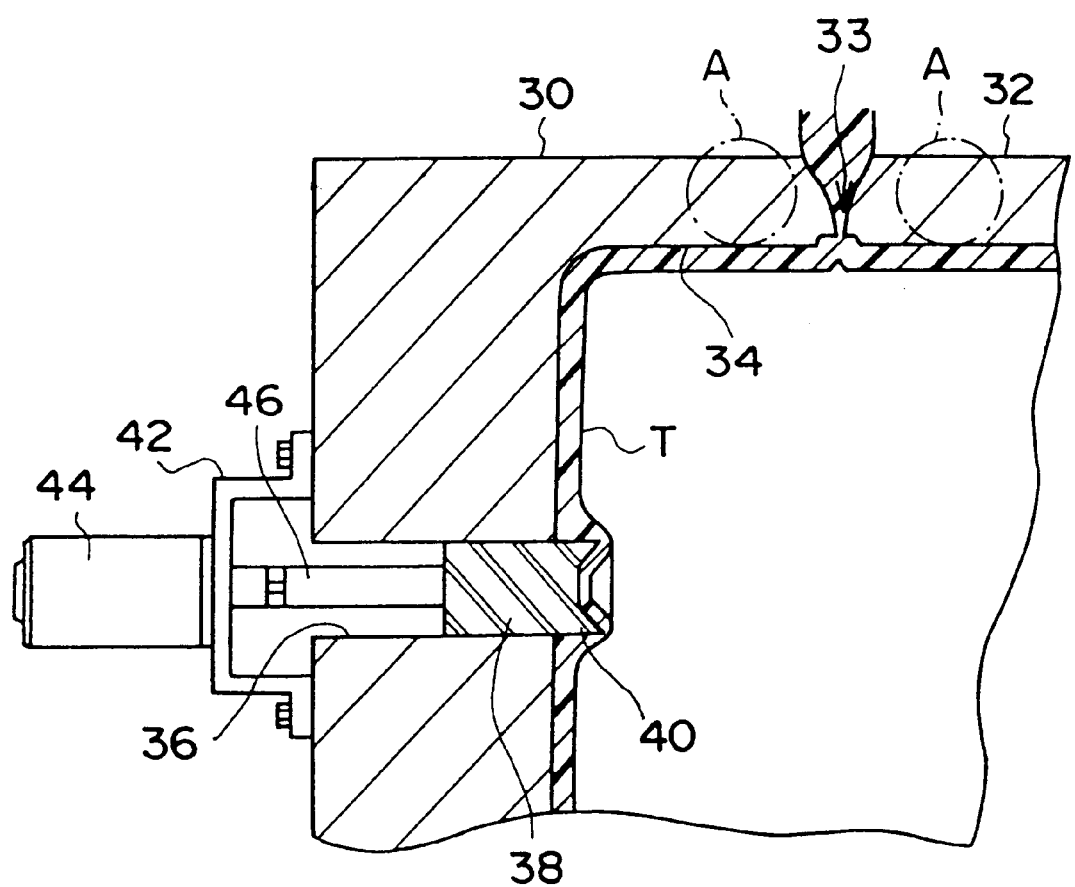
FIG. 1 is a cross-sectional view which shows a principal process of a method of manufacturing a resinous tank relating to a first embodiment of the present invention.
Figure 2:
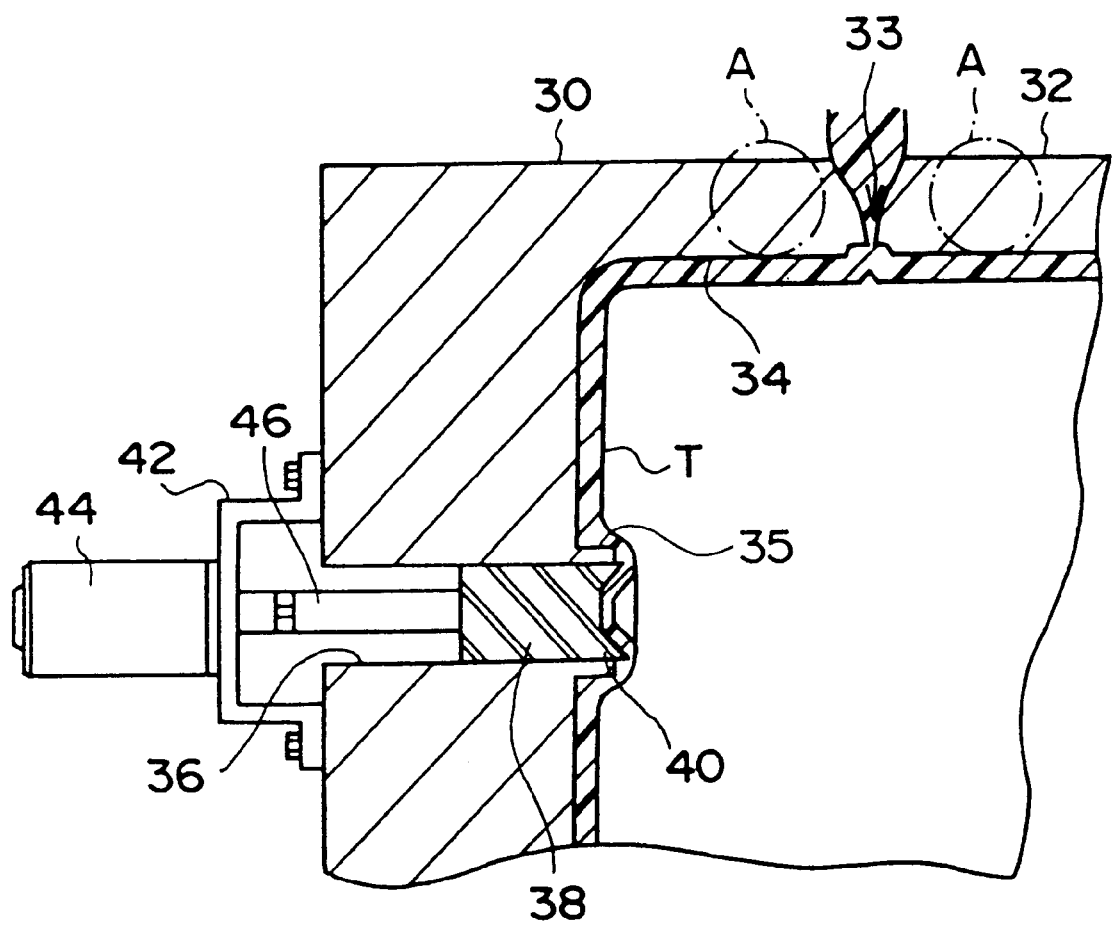
FIG. 2 is a cross-sectional view which shows a principal process of a method of manufacturing a resinous tank relating to a second embodiment of the present invention.

FIG. 1 shows a cross-sectional view of a principal process of a method of manufacturing a resinous tank relating to the first embodiment of the present invention and FIG. 2 shows a cross-sectional view of a principal process of a method of manufacturing a resinous tank relating to the second embodiment of the present invention.

The present manufacturing method is basically blow molding. In the method, the aforementioned washer tank 10 can be manufactured and a pair of male and female segmental molding dies 30 and 32 are used. A cavity 34 in accordance with the washer tank 10 (the product) is formed by these pair of segmental molding dies 30 and 32.

Figure 5:
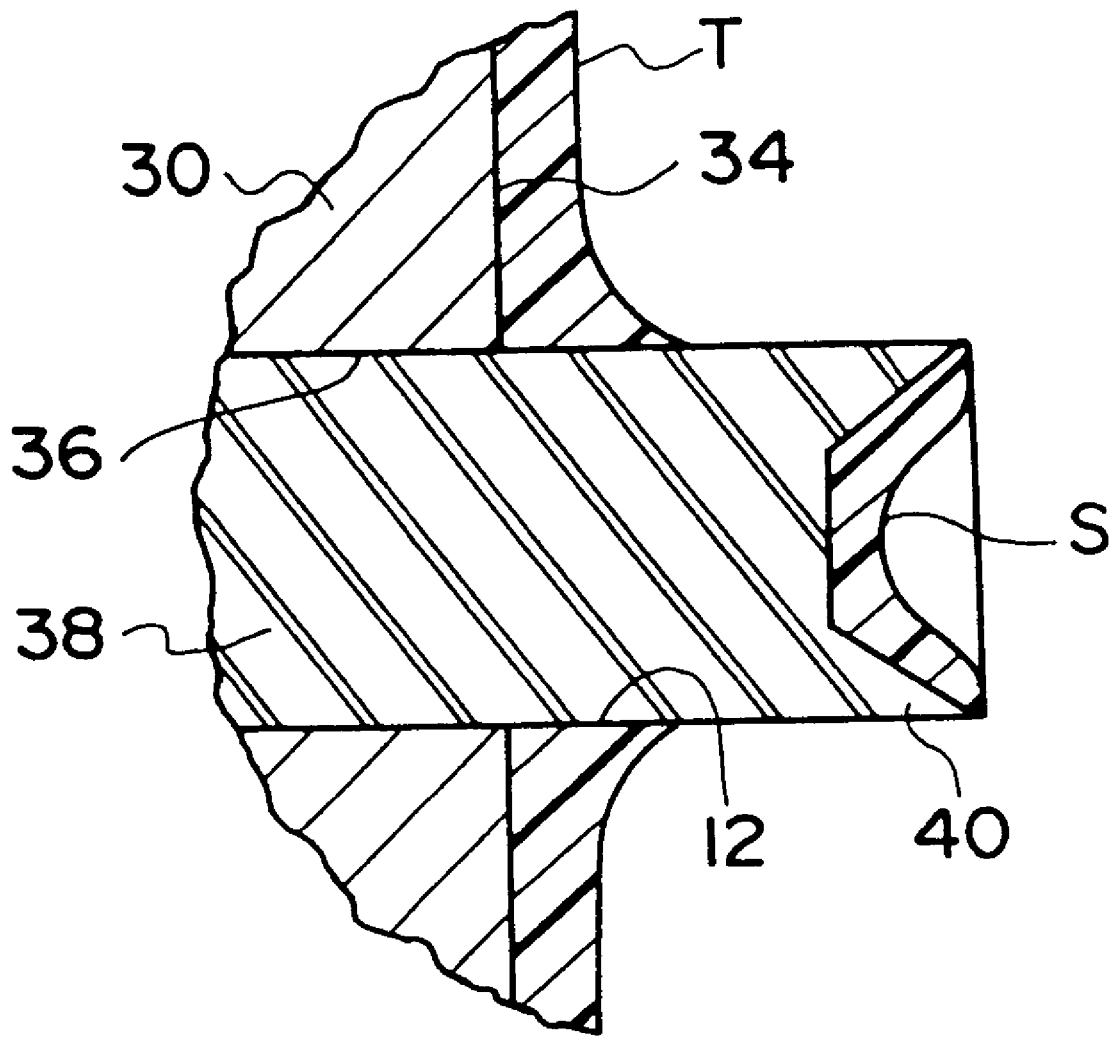
FIG. 5 is a cross-sectional view which shows the principal process of the method of manufacturing a resinous tank relating to the first embodiment of the present invention in a state in which a resin parison corresponding to the through-hole of a hollow body is cut out.

Further, in the first embodiment of the present invention, a tool hole 36 is formed at the molding die 30. Moreover, a tool 38 with a blade (hereinafter, "tool 38") is disposed at this tool hole 36. The tool 38 is columnar-shaped, and further, as shown in detail in FIGS. 3 and 5, an edge portion 40 is formed at the distal end of the tool 38.

In this case, the tool hole 36 (i.e., the tool 38) corresponds to the through-hole 12 of the aforementioned washer tank 10, and further, the cavity 24 is formed at the molding die 30 in the vicinity of the tool hole 36 so as to mold the pump fitting portion 14 (the undercut portion).

Moreover, in the second embodiment of the present invention, a convex portion or projection 35 and the tool hole 36 are formed at the molding die 30. The convex portion 35 is cylindrical so as to correspond to the through-hole 12 of the aforementioned washer tank 10 and is provided so as to protrude further inwardly than the general molding surface of the molding die 30. Further, the tool hole 36 is formed inside the convex portion 35 (so as to be continuous with the inner cavity of the convex portion 35).

Further, the cavity 34 is formed at the molding die 30 in the vicinity of the tool hole 36 so as to mold the pump fitting portion 14 (the undercut portion).

Figure 6:
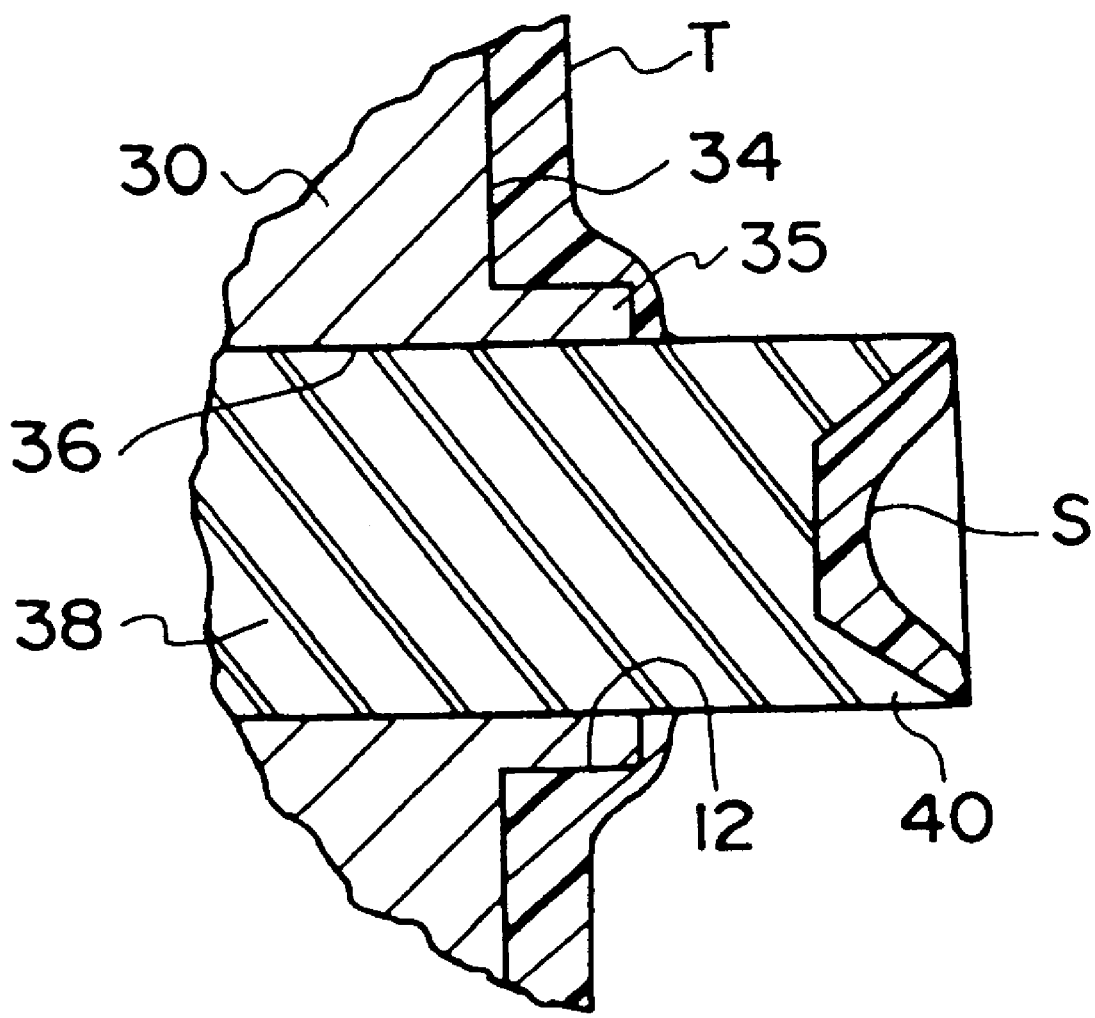
FIG. 6 is a cross-sectional view which shows the principal process of the method of manufacturing a resinous tank relating to the second embodiment of the present invention in a state in which a resin parison corresponding to the through-hole of a hollow body is cut out.

Furthermore, a tool 38 with a blade (hereinafter, "tool 38") is disposed at the tool hole 36. The tool 38 is columnar shaped, and further, as shown in detail in FIGS. 4 and 6, an edge portion 40 is formed at the distal end of the tool 38. Therefore, the edge portion 40 of the tool 38 corresponds to the through-hole 12 of the aforementioned washer tank 10.

Moreover, in the first and second embodiments of the present invention, a cylinder 44 is fixed to the molding die 30 via a fixed stand 42. A rod 46 of the cylinder 44 is connected to the back of the tool 38. The rod 46 extends and retracts due to the operation of the cylinder 44 and the tool 38 can be moved within the tool hole 36.

In the first embodiment of the present invention, when the washer tank 10 is molded, the tool 38 is provided beforehand so as to protrude further inwardly than the molding surface (the cavity 34) of the molding die 30.

In the second embodiment of the present invention, when the washer tank 10 is molded, the tool 38 is provided beforehand so as to protrude further inwardly than (or to be flush with) the distal end surface (the cavity 34) of the convex portion 35.

Figure 7:
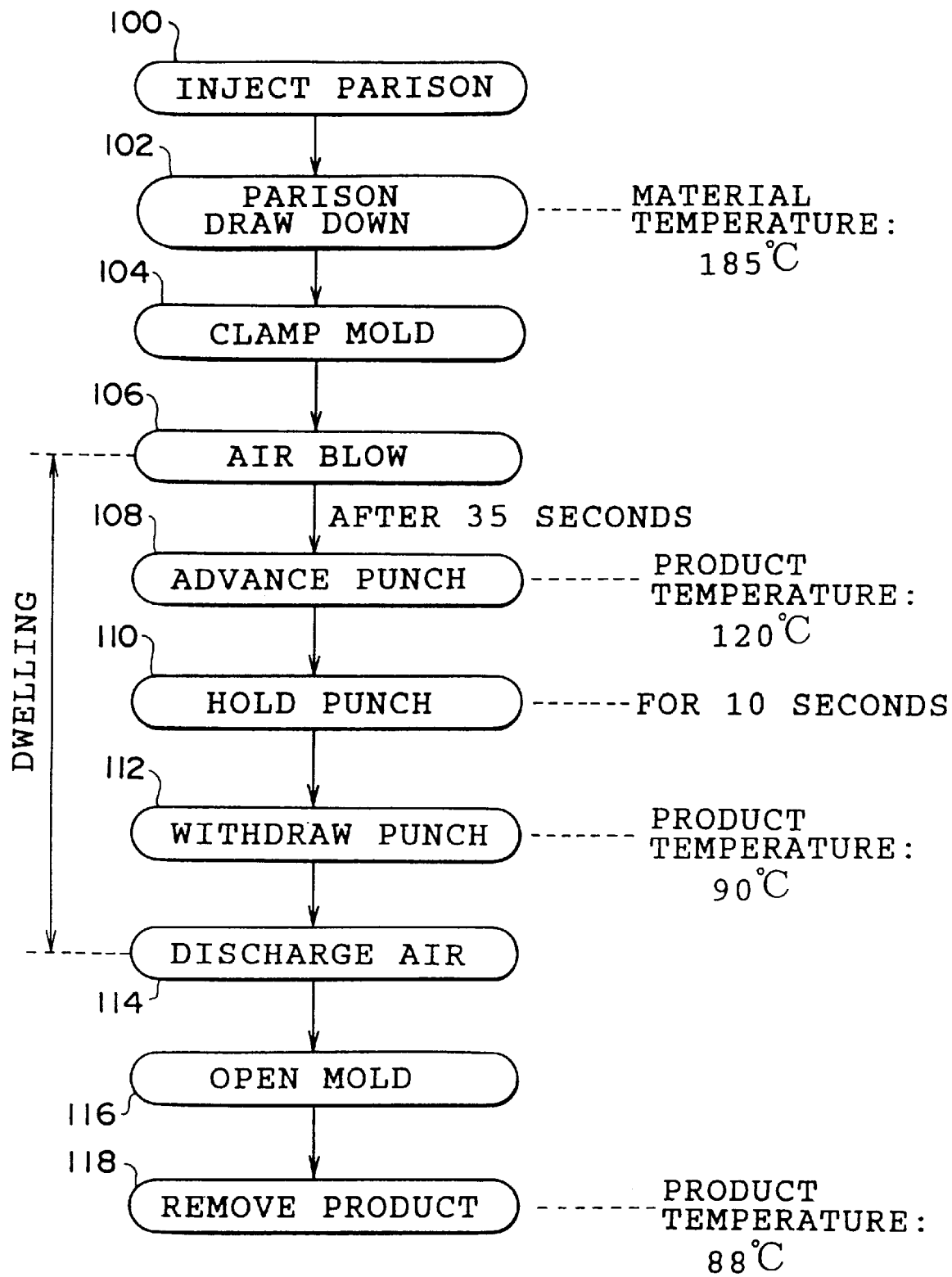
FIG. 7 is a flowchart which shows a concrete process of the method of manufacturing a resinous tank relating to the first and second embodiments of the present invention.

Next, FIG. 7 is a flowchart which shows a concrete process of the method of manufacturing a resinous tank relating to the first and second embodiments of the present invention. The concrete process of the manufacturing method of the present invention will be explained accordingly.

As mentioned above, when the washer tank 10 in the first embodiment of the present invention is molded, the tool 38 is provided beforehand so as to protrude further inwardly than the molding surface of the molding die 30.

As mentioned above, when the washer tank 10 in the second embodiment of the present invention is molded, the molding die 30 provided with the convex portion 35 and the molding die 32 are set, and the tool 38 is provided beforehand so as to protrude further inwardly than the distal end surface of the convex portion 35.

In the first and second embodiments of the present invention, after the segmental molding dies 30 and 32 and the tool 38 are set, at first, in step 100, a resin parison is injected. Further, in step 102, the injected resin parison draws down by its own weight. The material temperature in this step is, for example, 185° C.

Next, in step 104, the resin parison is clamped by the segmental molding dies 30 and 32. Further, in step 106, compressed air is blown (air blowing) into the resin parison in a state in which the mold clamping pressure of the segmental molding dies 30 and 32 is maintained. The air blowing time is, for example, 35 seconds.

Figure 3:
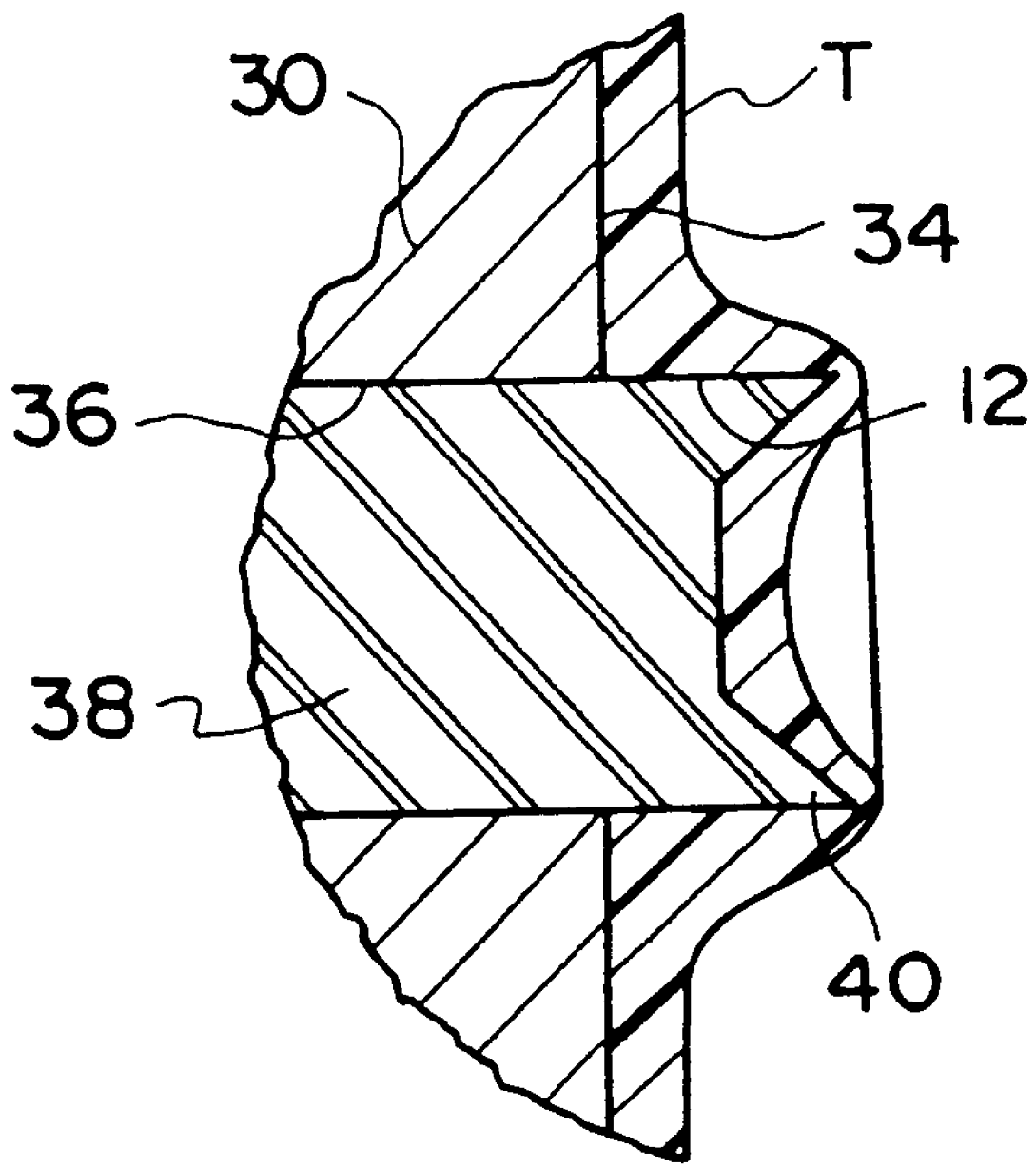
FIG. 3 is a cross-sectional view which shows the principal process of the method of manufacturing a resinous tank relating to the first embodiment of the present invention in a state in which a resin cavity is pressed and adhered to a molding surface.

In the first embodiment of the present invention, in this way, the resin parison is expanded within the cavity 34 of the segmental molding dies 30 and 32. As shown in FIGS. 1 and 3, the resin parison is pressed by the molding surface (the cavity 34) of the segmental molding dies 30 and 32 and is adhered to the circumferential wall of the tool 38.

In this state, the edge portion 40 of the tool 38 protrudes further inwardly than the thickness of a general portion of the pressed resin parison, and the inner circumferential wall surface of the through-hole 12 is molded by the circumferential wall of the tool 38. A hollow body T is formed in this state.

Figure 4:
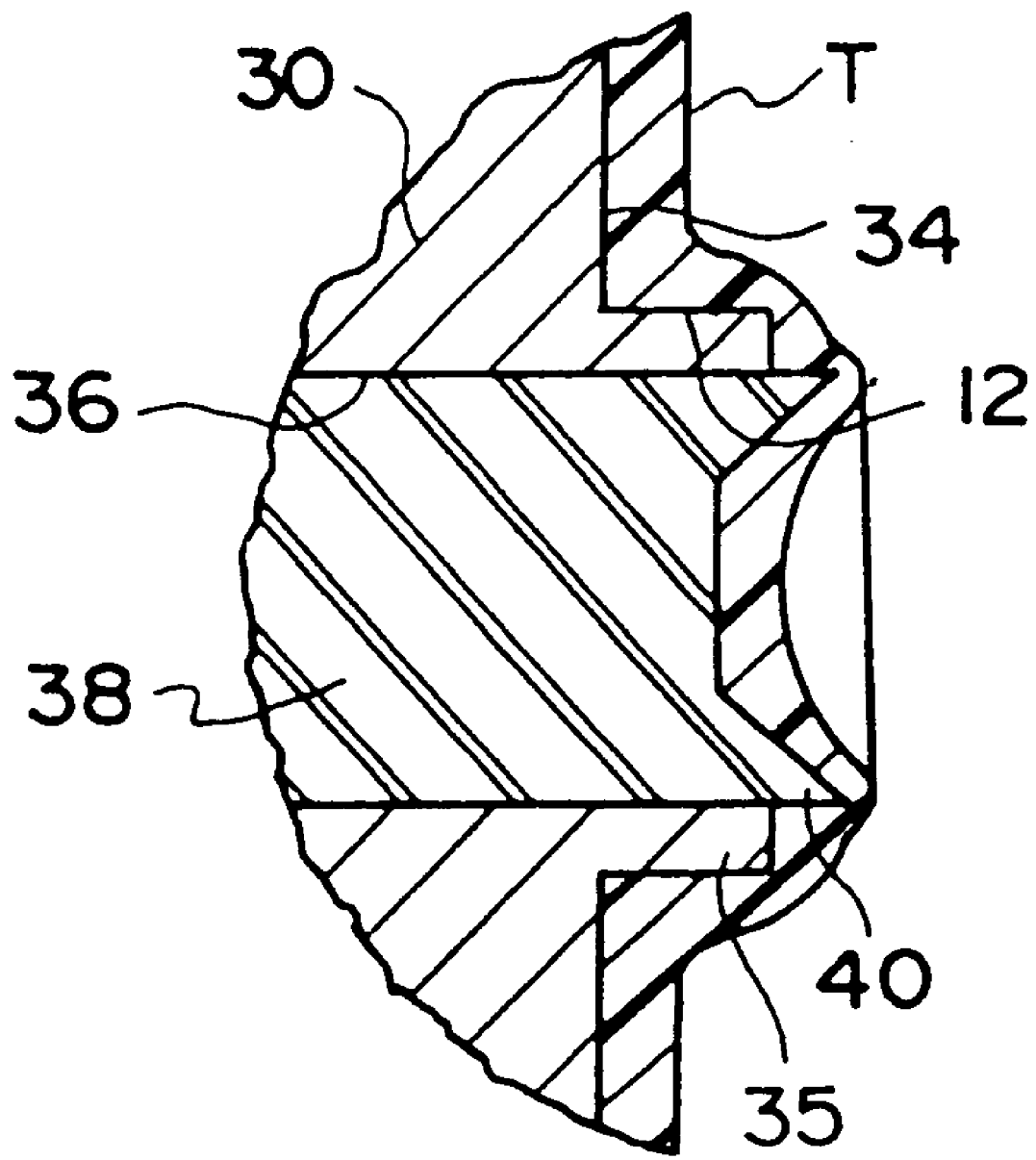
FIG. 4 is a cross-sectional view which shows the principal process of the method of manufacturing a resinous tank relating to the second embodiment of the present invention in a state in which a resin cavity is pressed and adhered to a molding surface.

In the second embodiment of the present invention, in this way, the resin parison is expanded within the cavity 34 of the segmental molding dies 30 and 32. As shown in FIGS. 2 and 4, the resin parison is pressed by the molding surface (the cavity 34) of the segmental molding dies 30 and 32 and adhered to the circumferential wall of the convex portion 35.

In this way, the inner circumferential wall surface of the through-hole 12 is molded by the circumferential wall of the convex portion 35. A hollow body T is formed in this state.

Next, in the first and second embodiments of the present invention, in step 108, the cylinder 44 is operated and the tool 38 is advanced in the inner direction of the hollow body T (the segmental molding dies 30 and 32). In this way, as shown in FIG. 3, the resin parison of the hollow body T corresponding to the edge portion 40 of the tool 38 is cut out and the through-hole 12 is formed. At this time, the temperature of the hollow body T (the resin parison) is, for example, 120° C.

After the resin parison of the hollow body T is cut out and the through-hole 12 is formed, in step 110, the tool 38 is held in its moved state (e.g., for 10 seconds). In this state, the hollow body T and the cut-out piece S are cooled to about 90° C.

Further, in step 112, the cylinder 44 is operated again, and the tool 38 is withdrawn in the direction opposite the aforementioned direction and removed from the hollow body T (the segmental molding dies 30 and 32). At this time, the cut-out piece S may drop inside the hollow body T. However, since the hollow body T and the cut-out piece S were cooled in step 110, the cut-out piece S does not adhere to the inner portion of the hollow body T.

Thereafter, in step 114, air within the segmental molding dies 30 and 32 is discharged. In step 116, the segmental molding dies 30 and 32 are opened. Moreover, in step 118, the hollow body T provided with the through-hole 12 is taken out and thereby the resinous washer tank 10 is manufactured. At this point, the temperature of the washer tank 10 is, for example, 88° C. When the cut-out piece S drops inside the hollow body T, a process for taking out the cut-out piece S remained within the hollow body T is implemented after step 118.

In accordance with the method of manufacturing a resinous tank relating to the first and second embodiments, the resin parison is expanded within the segmental molding dies 30 and 32 and adhered to the circumferential wall of the tool 38 or the convex portion 35. Accordingly, the through-hole 12 of the washer tank 10 is formed. Namely, because the inner circumferential wall surface of the through-hole 12 is not a cut surface and is formed in accordance with the circumferential wall of the tool 38 or the convex portion 35 (because the circumferential wall of the tool 38 or the convex portion 35 is the inner circumferential wall surface of the through-hole 12), the surface roughness of the inner circumferential wall portion (the seal surface) can be made good (the necessary surface roughness can be guaranteed). Therefore, the sealability of the through-hole 12 can be guaranteed and the washer tank 10 is suitable as a vehicle washer tank.

Further, unlike the conventional example, the through-hole 12 is not formed through subsequent machining using tools such as a drill or the like and can be formed at the same time that the hollow body T is molded through blow molding. The washer tank 10 provided with the through-hole 12 can be formed in one manufacturing process and the cost of manufacturing can be reduced.

Figure 10:
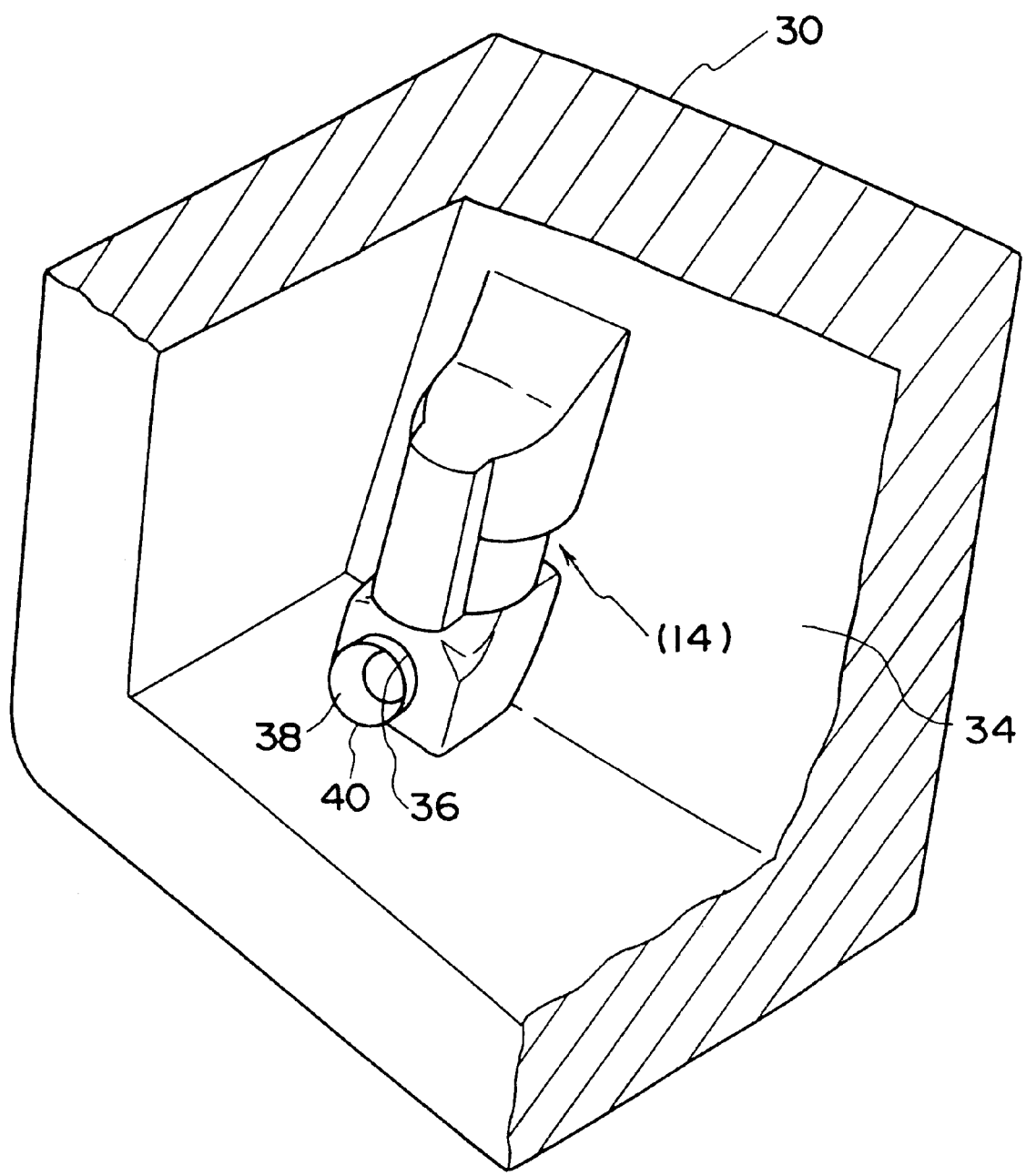
FIG. 10 is a perspective view which, seen from the inner side, shows the molding surface (the cavity) of a molding die corresponding to a pump fitting portion (undercut portion) of the washer tank which is manufactured using the method of manufacturing a resinous tank relating to the first embodiment of the present invention.
Figure 11:
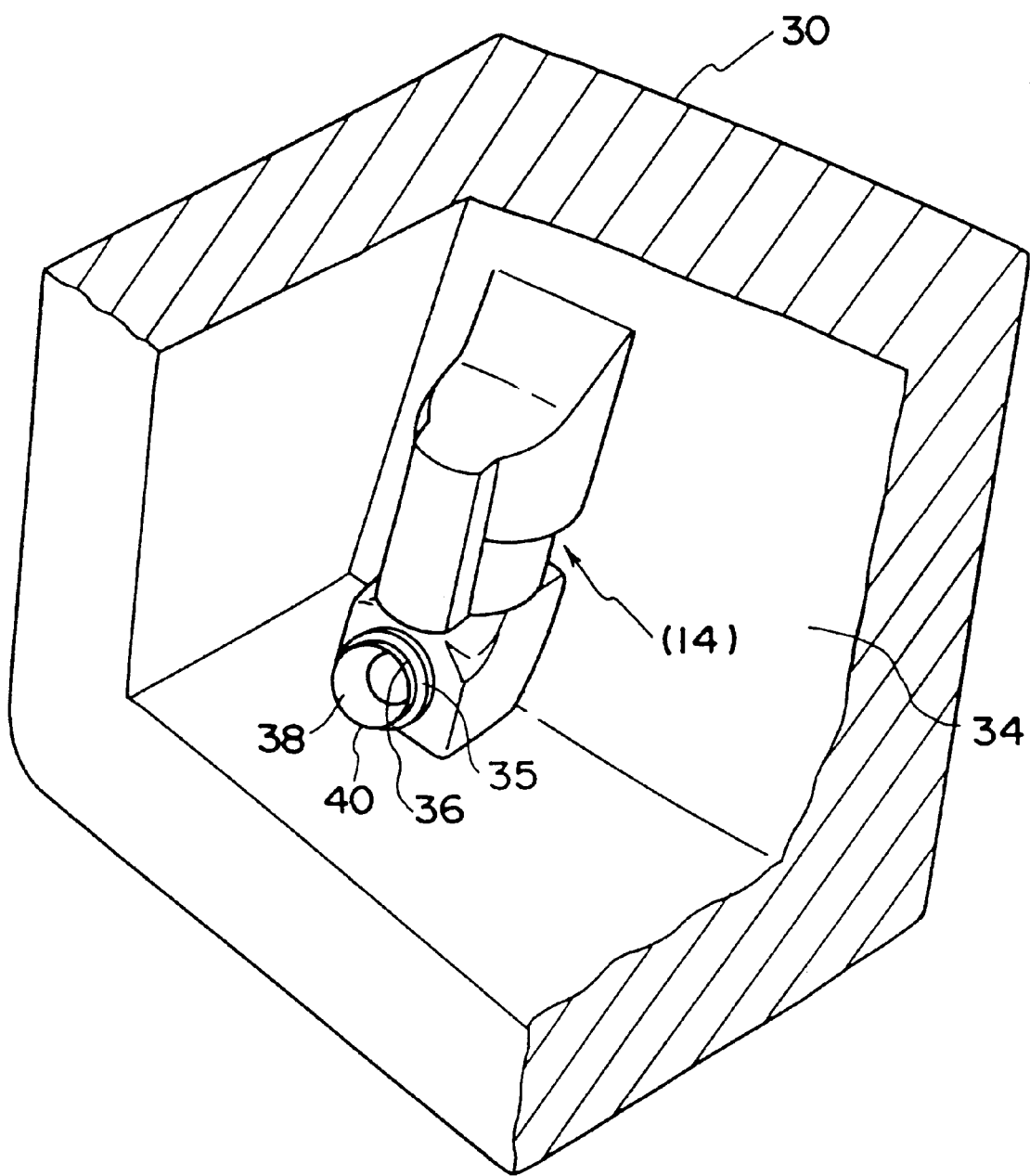
FIG. 11 is a perspective view which, seen from the inner side, shows the molding surface (the cavity) of a molding die corresponding to a pump fitting portion (undercut portion) of the washer tank which is manufactured using the method of manufacturing a resinous tank relating to the second embodiment of the present invention.

Moreover, in the method of manufacturing a resinous tank relating to the first and second embodiments of the present invention, as shown in FIGS. 10 and 11, the molding surface (the cavity 34) of the molding die 30 is formed so as to mold the pump fitting portion 14 (the undercut portion) in the hollow body T. In the vicinity of the molding die 30 corresponding to the pump fitting portion 14 of the hollow body T, the tool 38 or the convex portion 35 is provided and the through-hole 12 is molded.

Figure 12:
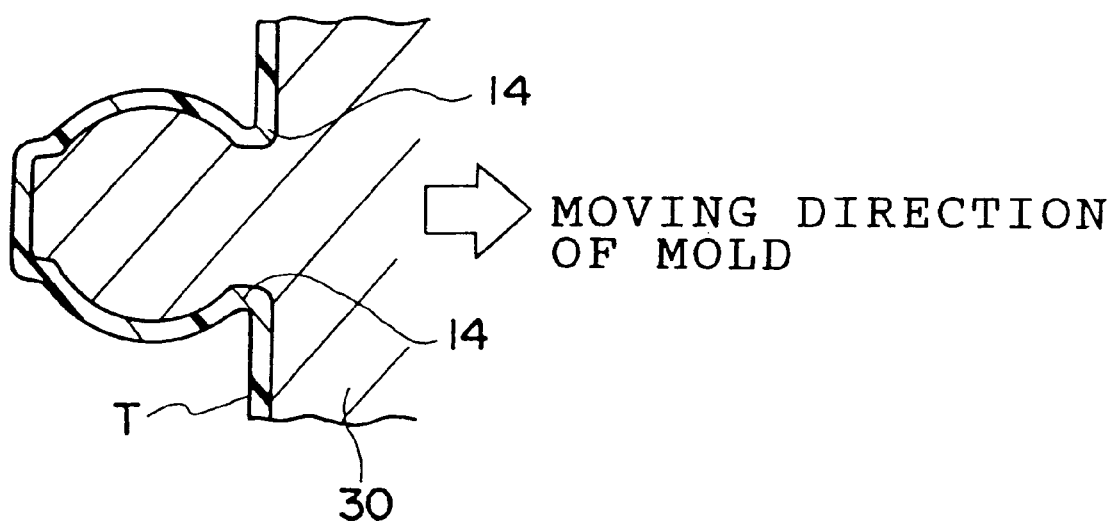
FIG. 12 is a schematic cross-sectional view which shows the corresponding relationship between the molding die and the pump fitting portion (undercut portion) of the washer tank which is manufactured using the method of manufacturing a resinous tank relating to the first and second embodiments of the present invention.

As shown in FIG. 12, it is, of course, difficult to separate the pump fitting portion 14 (the undercut portion) of the hollow body T from the molding die 30. In other words, the hollow body T is reliably held in the molding die 30. Accordingly, when the tool 38 is advanced in the inner direction of the hollow body T so as to cut out the resin parison of the hollow body T and form the through-hole 12, the hollow body T (the general portion of the resin parison) is not shifted or moved unnecessarily due to the movement of the tool 38, and the resin parison corresponding to the through-hole 12 can be reliably cut out. As a result, the product accuracy of the washer tank 10 further improves.

In this way, in the method of manufacturing a resinous tank relating to the first and second embodiments of the present invention, the surface roughness of the seal surface of the through-hole 12 in the washer tank 10 can be made good and this can be realized at a low cost without requiring complicated machining.

Next, the other embodiments of the present invention will be explained.

Parts and manufacturing processes which are basically the same as those in the first and second embodiments are denoted by the same reference numerals, and descriptions thereof are omitted.

Figure 13:
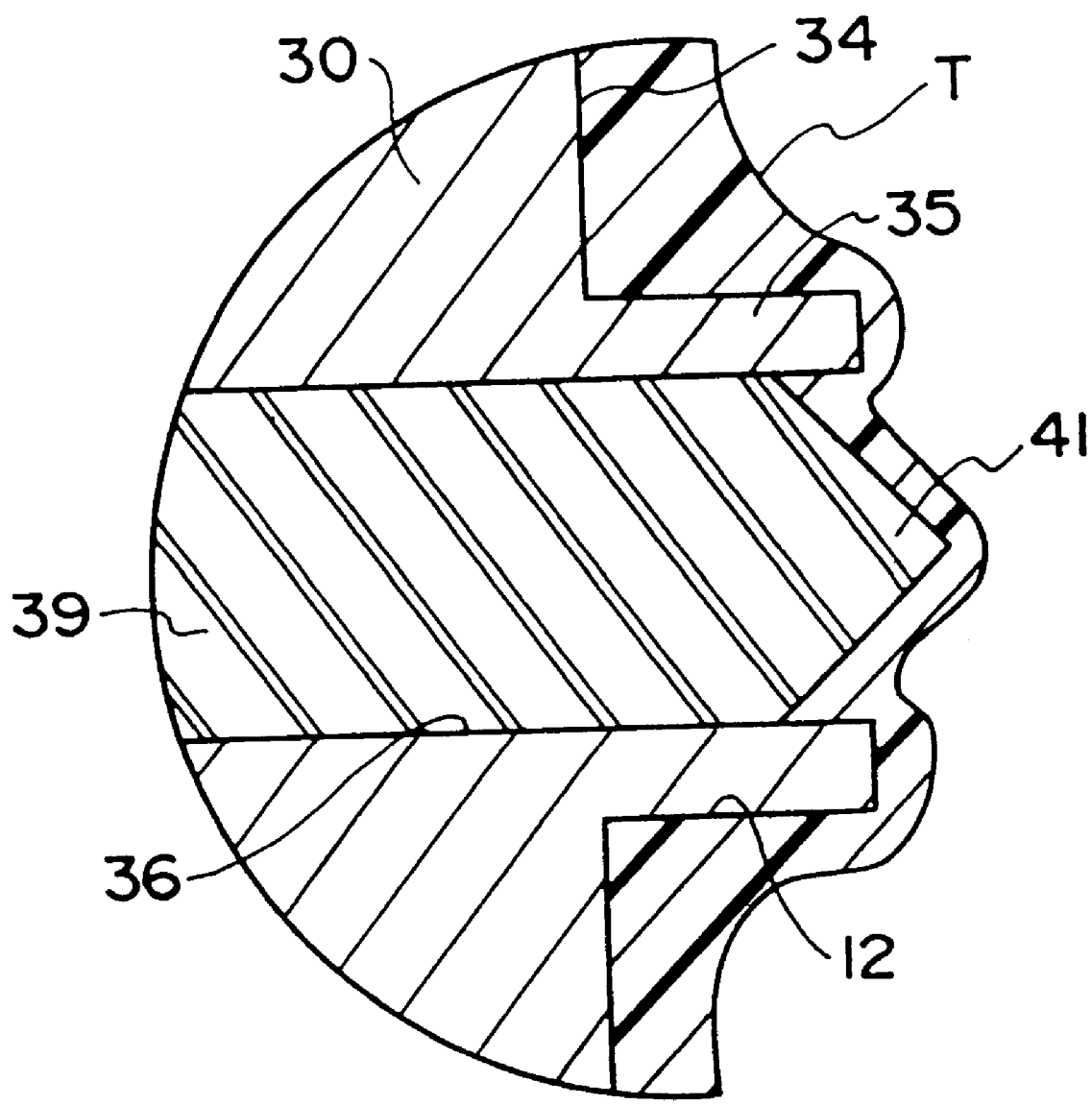
FIG. 13 is a cross-sectional view which shows a principal process of a method of manufacturing a resinous tank relating to a third embodiment of the present invention.

FIG. 13 is a cross-sectional view which shows a principal process of a method of manufacturing a resinous tank relating to a third embodiment of the present invention.

In the method of manufacturing a resinous tank relating to the third embodiment, a tool 39 with a blade (hereinafter, "stool 39") is used instead of the tool 38 in the aforementioned first embodiment. A conical edge portion 41 is formed at the tool 39. When a washer tank 10 is molded, an edge portion 41 is provided beforehand in a state in which the edge portion 41 is placed at the inner cavity (tool hole 36) of a convex portion 35.

In the method of manufacturing a resinous tank relating to the third embodiment, the washer tank 10 is molded through the same process as the process shown in FIG. 7. Namely, a resin parison is expanded within segmental molding dies 30 and 32 and adhered to the circumferential wall of the convex portion 35. Accordingly, a through-hole 12 of the washer tank 10 is formed. In this case as well, because the inner circumferential wall surface of the through-hole 12 is not a cut surface and is formed in accordance with the circumferential wall of the convex portion 35 (because the circumferential wall of the convex portion 35 is the inner circumferential wall surface of the through-hole 12), the surface roughness of the inner circumferential wall portion (the seal surface) can be made good (the necessary surface roughness can be guaranteed). Therefore, the sealability of the through-hole 12 can be guaranteed.

In this way, because the inner circumferential wall portion (the seal surface) of the through-hole 12 of the washer tank 10 is formed in accordance with the circumferential wall of the convex portion 35, even if the edge portion 41 of the tool 39 can be conical, the sealability of the through-hole 12 can be guaranteed and the degree of freedom in determining the shape and structure of the edge portion 41 of the tool 39 improves.

Figure 14:
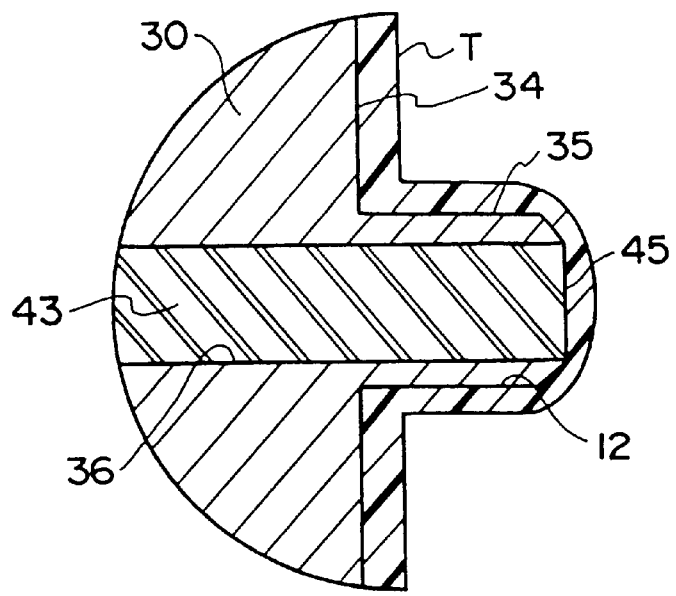
FIG. 14 is a cross-sectional view which shows a principal process of a method of manufacturing a resinous tank relating to a fourth embodiment of the present invention in a state in which a resin cavity is pressed and adhered to a molding surface.
Figure 15:
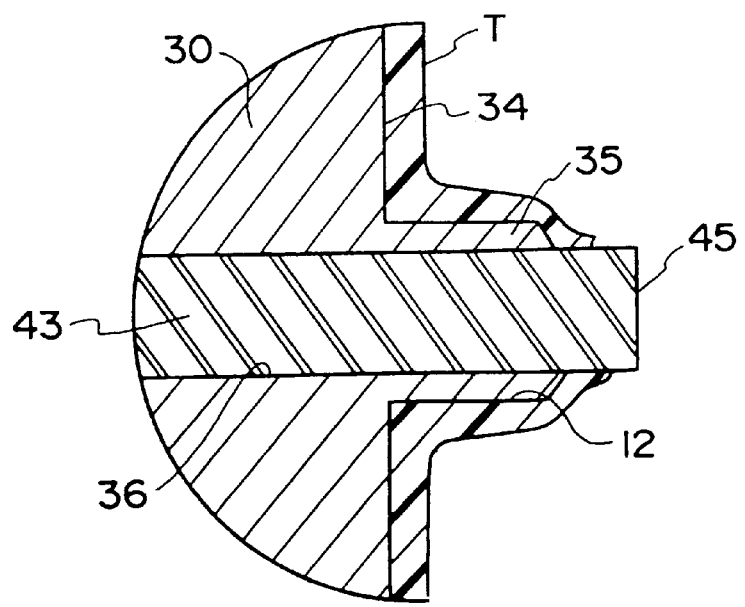
FIG. 15 is a cross-sectional view which shows the principal process of the method of manufacturing a resinous tank relating to the fourth embodiment of the present invention in a state in which a resin parison corresponding to the through-hole of a hollow body is cut out.

Next, FIGS. 14 and 15 is a cross-sectional view which shows a principal process of a method of manufacturing a resinous tank relating to a fourth embodiment of the present invention.

In the method of manufacturing a resinous tank relating to the fourth embodiment, a tool with a blade 43 is used instead of the tool 38 in the aforementioned second embodiment. A heater is provided at an edge portion 45 of the tool 43.

In the method of manufacturing a resinous tank relating to the fourth embodiment, a washer tank 10 is basically molded through the same process as the process shown in FIG. 7. However, in step 108, when the cylinder 44 is operated and the tool 43 is advanced in the inner direction of the hollow body T (segmental molding dies 30 and 32), the heater provided at the edge portion 45 operates and the resin parison of the hollow body T corresponding to the edge portion 45 is cut out while the resin parison is heated and melted. The through-hole 12 is thereby formed (the state shown in FIG. 15).

As a result, when the tool 43 is advanced in the inner direction of the hollow body T so as to cut out the resin parison and form the through-hole 12, there is no need to apply large pressing force to the cut-out portion of the resin parison. Therefore, the hollow body T (the general portion of the resin parison) is not shifted and moved unnecessarily due to the movement of the tool 43, and the resin parison corresponding to the through-hole 12 can be reliably cut out. As a result, the product accuracy further improves. Moreover, the through-hole 12 is easily formed even where the holding force of the hollow body T (the general portion of the resin parison) by the segmental molding dies 30 and 32 is low (in other words, the segmental molding dies 30 and 32 can be set regardless of the position at which the through-hole 12 is formed), the degree of freedom in design and the range of application increase.

Figure 16:
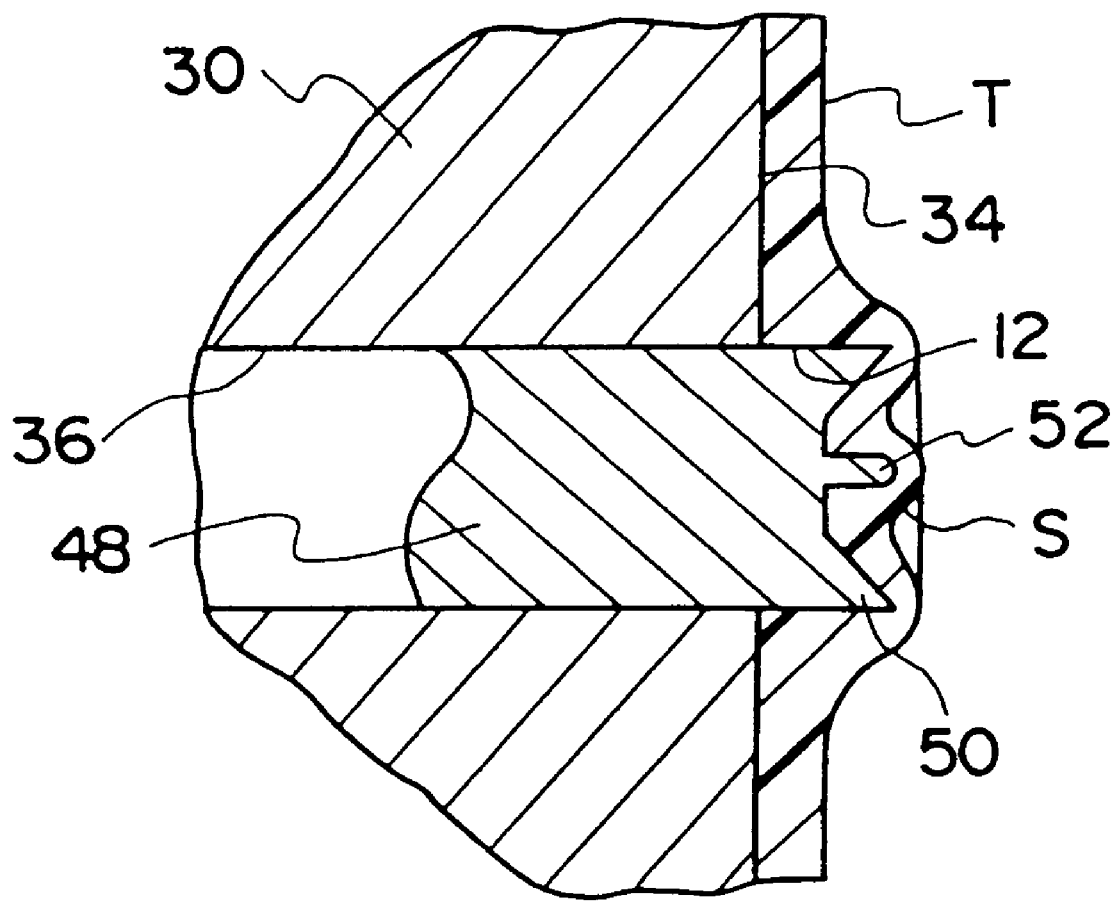
FIG. 16 is a cross-sectional view which shows a principal process of a method of manufacturing a resinous tank relating to a fifth embodiment of the present invention in a state in which a resin cavity is pressed and adhered to a molding surface.
Figure 17:
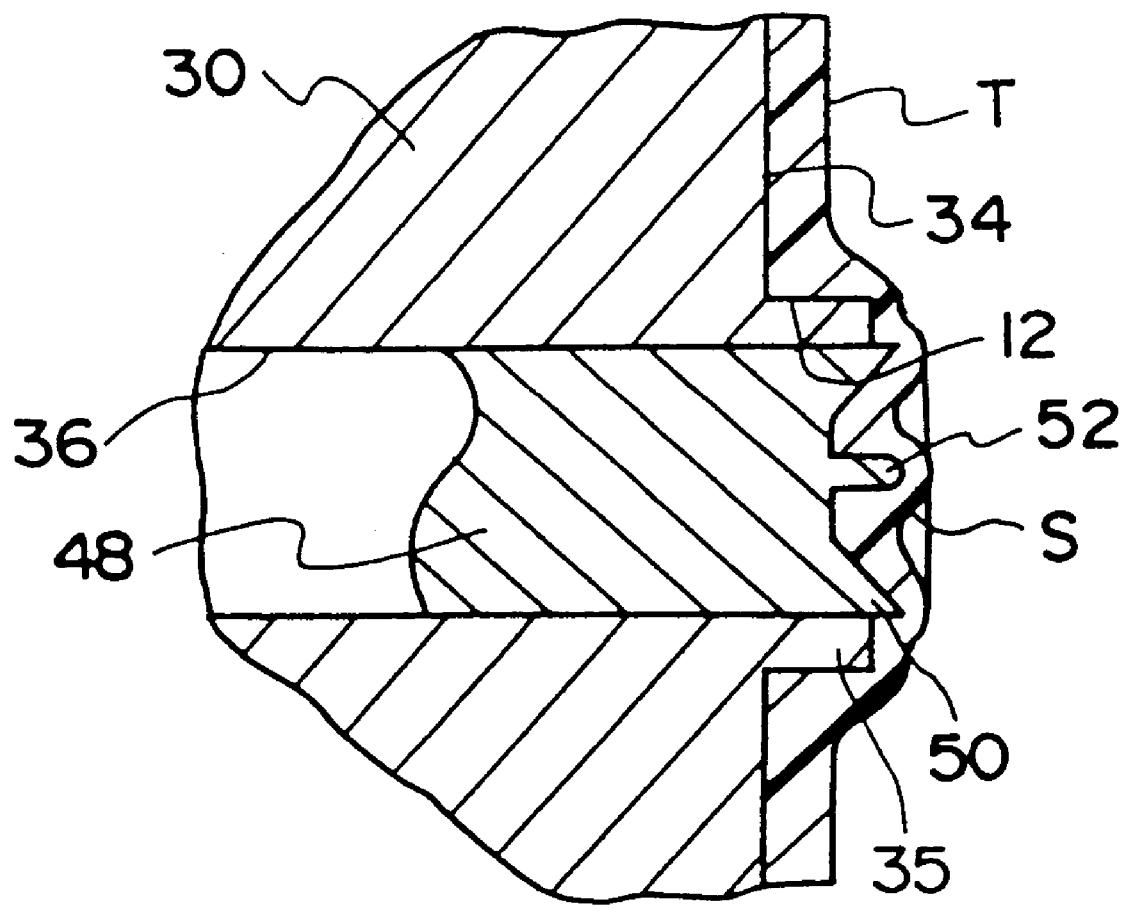
FIG. 17 is a cross-sectional view which shows a principal process of a method of manufacturing a resinous tank relating to a sixth embodiment of the present invention in a state in which a resin cavity is pressed and adhered to a molding surface.
Figure 18:
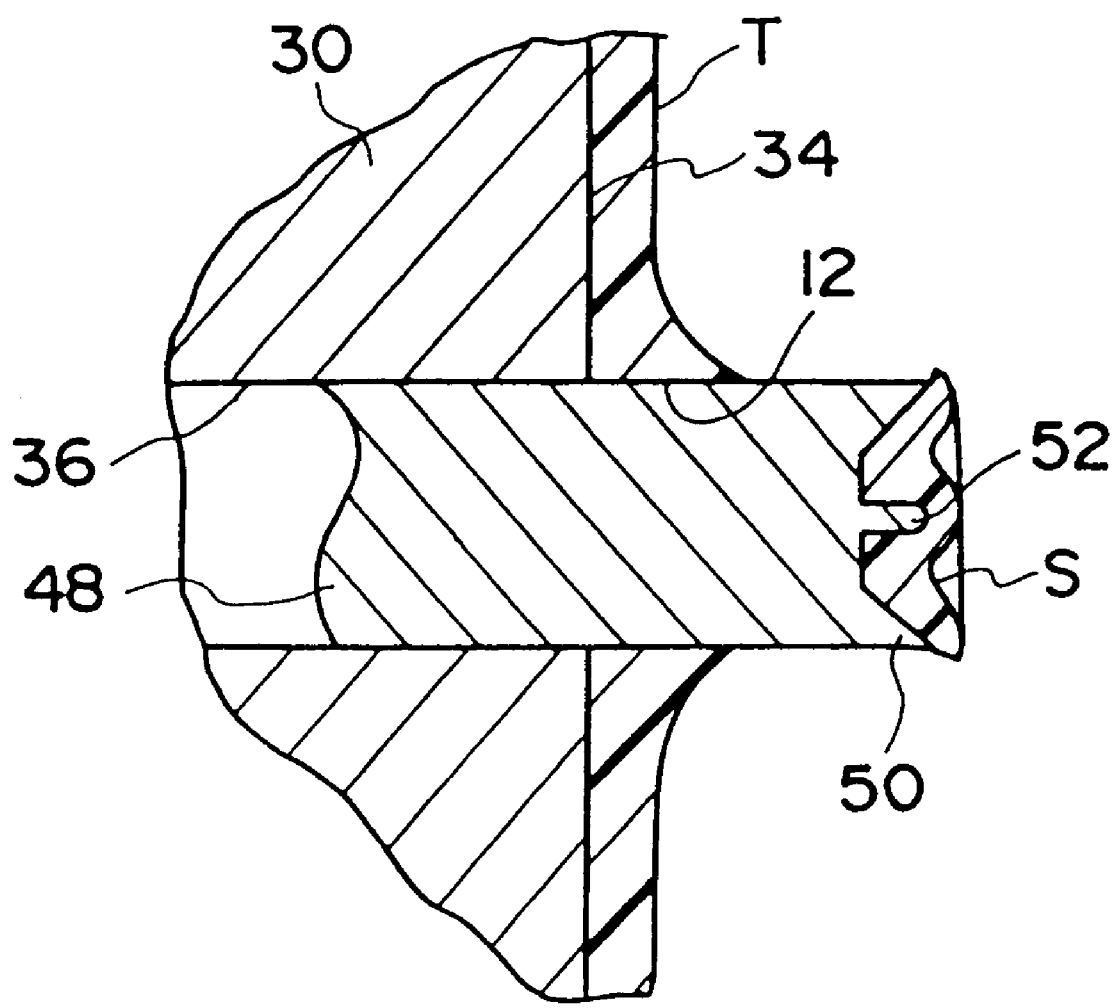
FIG. 18 is a cross-sectional view which shows the principal process of the method of manufacturing a resinous tank relating to the fifth embodiment of the present invention in a state in which a resin parison corresponding to the through-hole of a hollow body is cut out.
Figure 19:
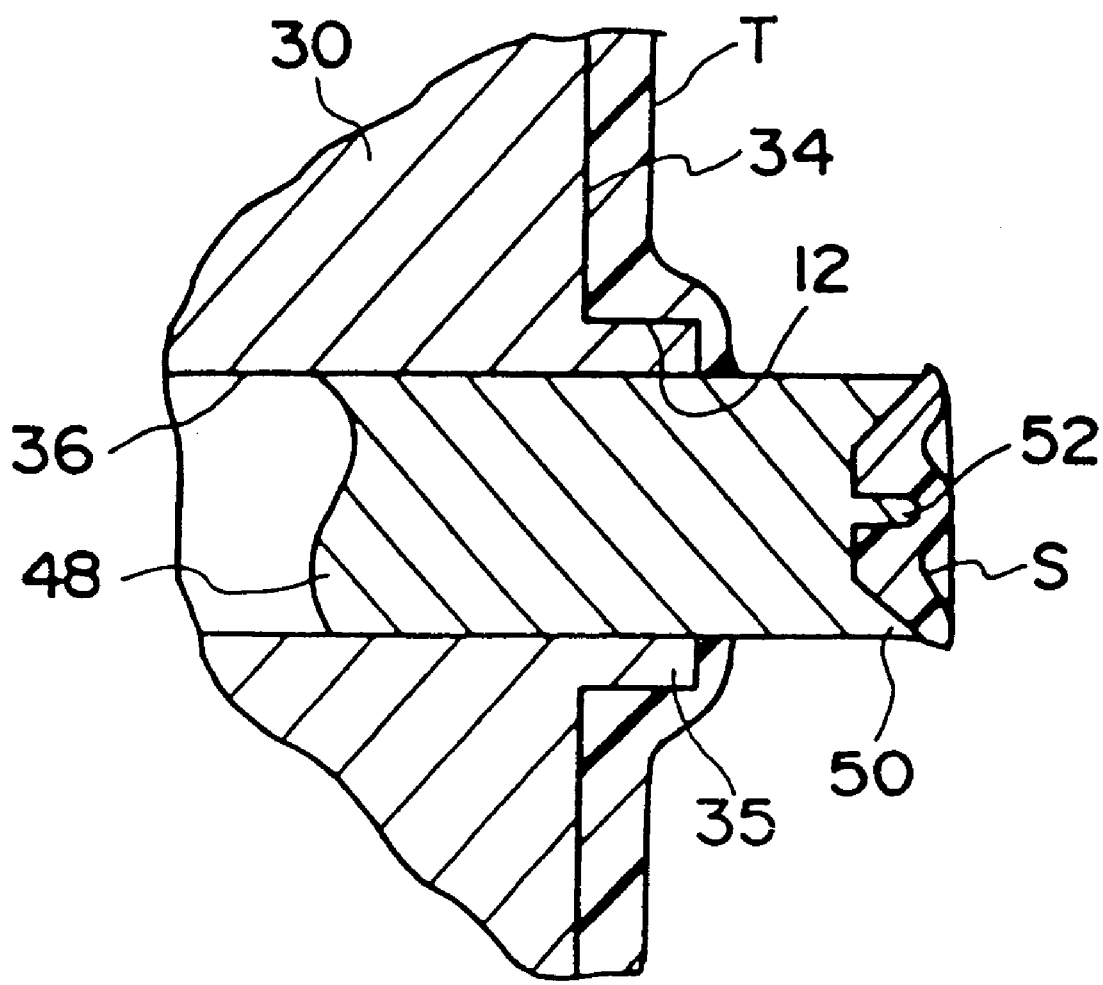
FIG. 19 is a cross-sectional view which shows the principal process of the method of manufacturing a resinous tank relating to the sixth embodiment of the present invention in a state in which a resin parison corresponding to the through-hole of a hollow body is cut out.

Next, FIGS. 16 and 18 is a cross-sectional view which shows a principal process of a method of manufacturing a resinous tank relating to a fifth embodiment of the present invention and FIGS. 17 and 19 is a cross-sectional view which shows a principal process of a method of manufacturing a resinous tank relating to a sixth embodiment of the present invention.

In the method of manufacturing a resinous tank relating to the fifth and sixth embodiments, a tool 48 with a blade (hereinafter, "tool 48") is used instead of the tool 38 in the aforementioned first and second embodiments. At the distal end of the tool 48, an edge portion 50 is formed and a holding pin 52 is protruded. When the tool 48 is advanced and the resin parison of the hollow body T corresponding to the edge portion 50 is cut out, the holding pin 52 serves to hold a cut-out piece S.

In the method of manufacturing a resinous tank relating to the fifth and sixth embodiments, the washer tank 10 is basically molded through the same process as the process shown in FIG. 7. However, when the resin parison is pressed to the molding surfaces of the segmental molding dies 30 and 32 and adhered to the circumferential wall of the tool 48 in step 106, the resin parison is also adhered to the circumference of the holding pin 52 (the states shown in FIGS. 16 and 17). Further, in step 108, when the cylinder 44 is operated and the tool 48 is advanced in the inner direction of the hollow body T (the segmental molding dies 30 and 32), as shown in FIGS. 18 and 19, the resin parison of the hollow body T corresponding to the edge portion 50 of the tool 48 is cut out and the through-hole 12 is formed.

Moreover, when the tool 48 is held in its moved state in step 110, the cut-out piece S is held securely by the holding pin 52. Therefore, even if the tool 48 is removed from the hollow body T (the segmental molding dies 30 and 32) afterwards, the cut-out piece S is eliminated from the hollow body T along with the tool 48.

Therefore, the cut-out piece S of the resin parison does not drop and remain inside the hollow body T. As a result, after the segmental molding dies 30 and 32 are opened and the hollow body T is taken out, there is no need to take out the remaining cut-out piece S later. The processes and the cost can be reduced.

In the fifth and sixth embodiments, the holding pin 52 protrudes at the distal end of the tool 48. However, the shape of the holding pin 52 is not limited to this and any shape is possible provided that the holding pin 52 can hold the cut-out piece S.

Figure 20:
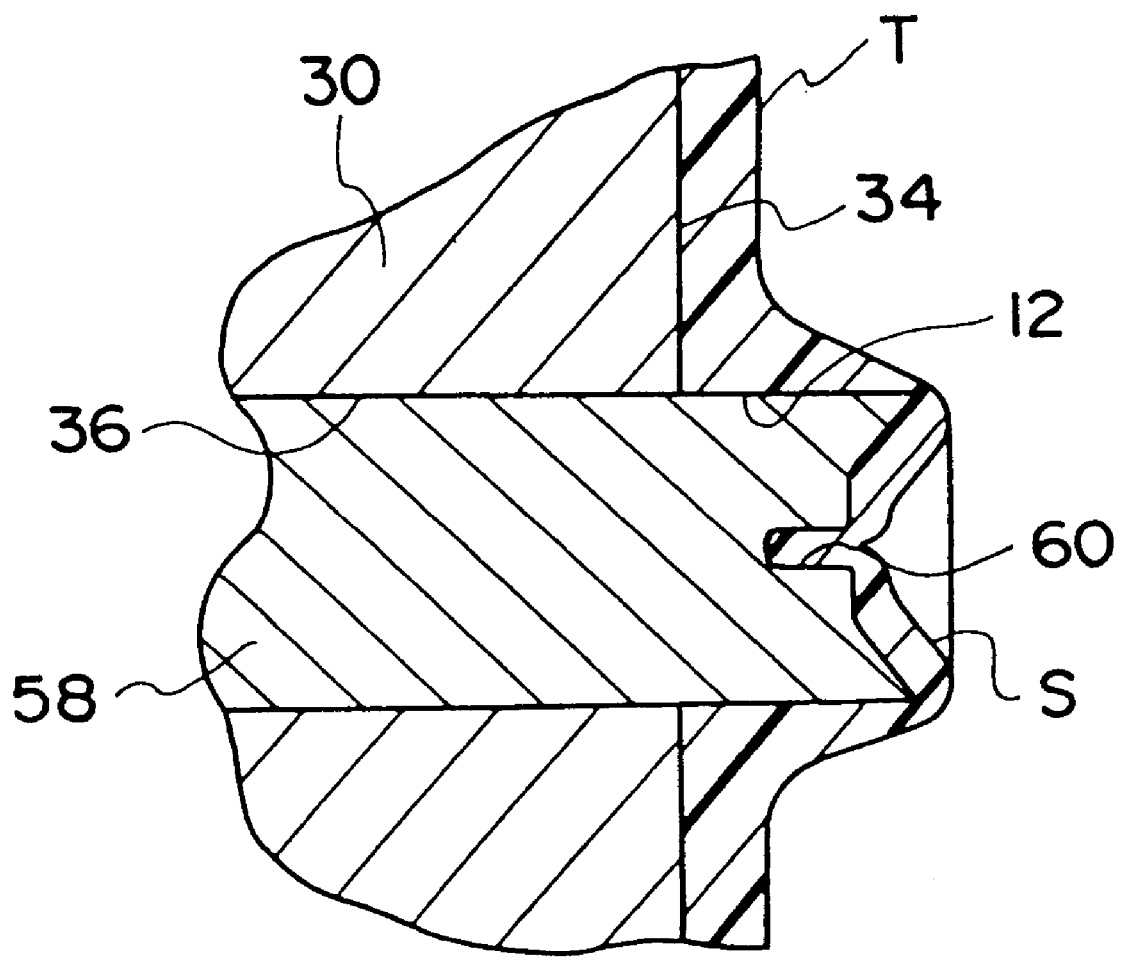
FIG. 20 is a cross-sectional view which corresponds to FIG. 16 and which shows a variant example of a tool with a blade which is applied to the method of manufacturing a resinous tank relating to the fifth embodiment of the present invention.
Figure 21:
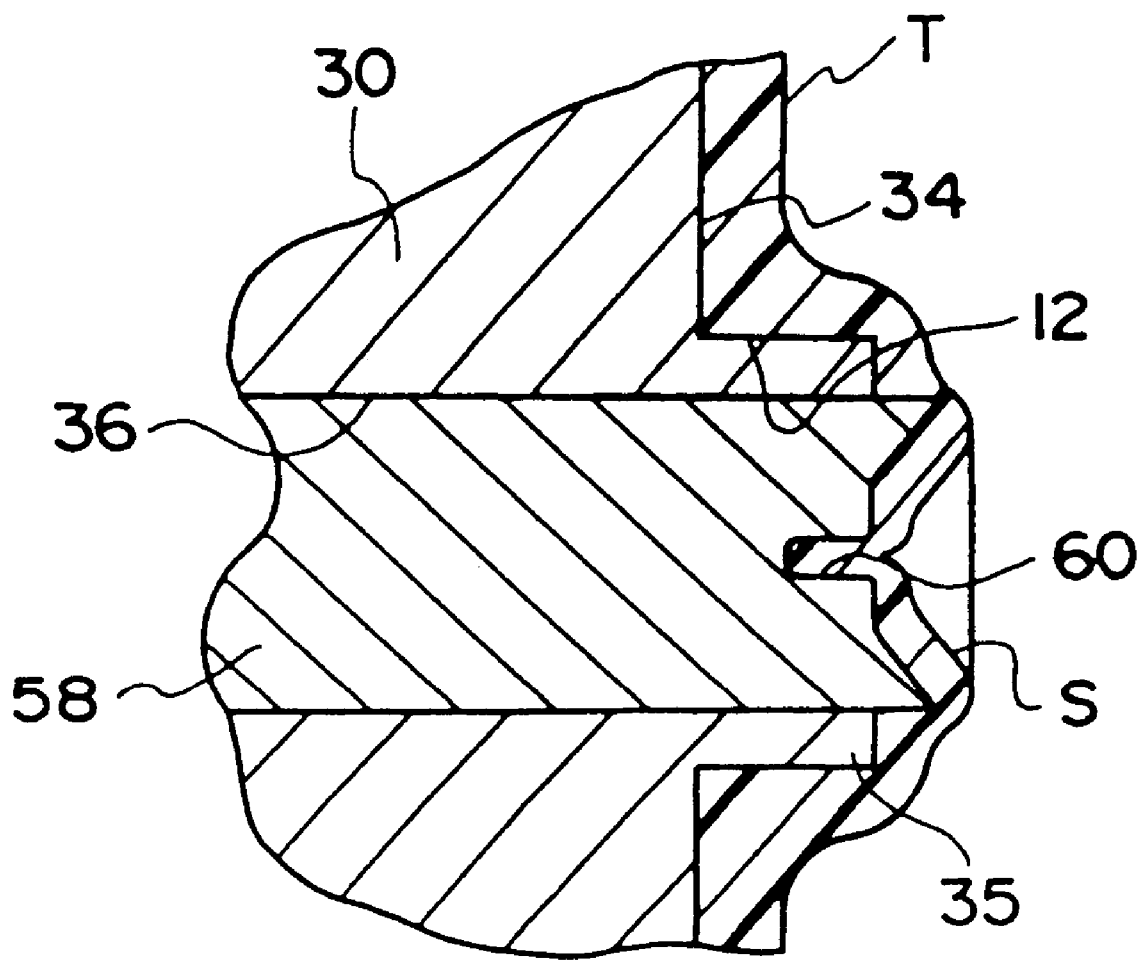
FIG. 21 is a cross-sectional view which corresponds to FIG. 17 and which shows a variant example of a tool with a blade which is applied to the method of manufacturing a resinous tank relating to the sixth embodiment of the present invention.

For example, as a tool 58 with a blade (hereinafter, "tool 58") shown in FIGS. 20 and 21, a holding groove 60 may be formed at the distal end thereof. Using this tool 58, when the resin parison is pressed to the molding surfaces of the segmental molding dies 30 and 32 and adhered to the circumferential wall of the tool 58, the resin parison enters into the holding groove 60. Accordingly, after the tool 58 is advanced in the inner direction of the hollow body T (segmental molding dies 30 and 32) and the resin parison of the hollow body T is cut out, the cut-out piece S is held by the holding groove 60. Therefore, even if the tool 58 is removed from the hollow body T (the segmental molding dies 30 and 32) afterwards, the cut-out piece S is eliminated from the hollow body T along with the tool 58 and does not drop and remain inside the hollow body T. Accordingly, there is no need to take out the cut-out piece S later and the processes and cost can be reduced.

Figure 22:
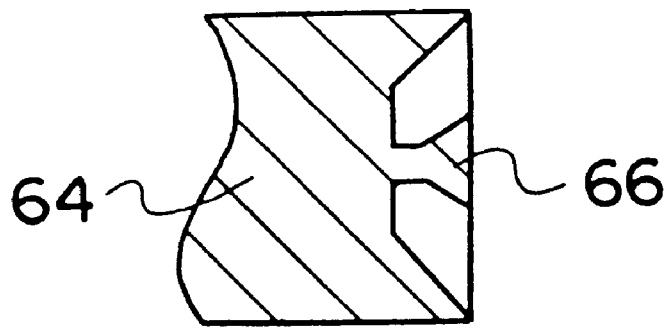
FIG. 22 is a cross-sectional view which shows a variant example of a tool with a blade which is applied to the method of manufacturing a resinous tank relating to the fifth and sixth embodiments of the present invention.
Figure 23:
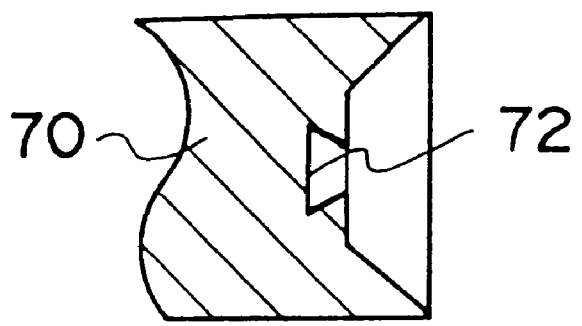
FIG. 23 is a cross-sectional view which shows another variant example of a tool with a blade which is applied to the method of manufacturing a resinous tank relating to the fifth and sixth embodiments of the present invention.

Additionally, for example, as shown in FIG. 22, a wedge-shaped holding convex portion 66 may be formed at the distal end of a tool 64 with a blade (hereinafter, "tool 64"). Using the tool 64, since the holding convex portion 66 is formed clavate inverted wedge-shaped, the holding force for the cut-out piece S improves remarkably. Consequently, the cut-out piece S can be eliminated from the hollow body T along with the tool 64 more reliably and the structure is even more effective. Furthermore, as shown in FIG. 23, a wedge-shaped holding concave portion 72 may be formed at the distal end of a tool 70 with a blade (hereinafter, "tool 70"). Even in this case as well, the holding force for the cut-out piece S improves remarkably and the structure is even more effective.

Figure 24:
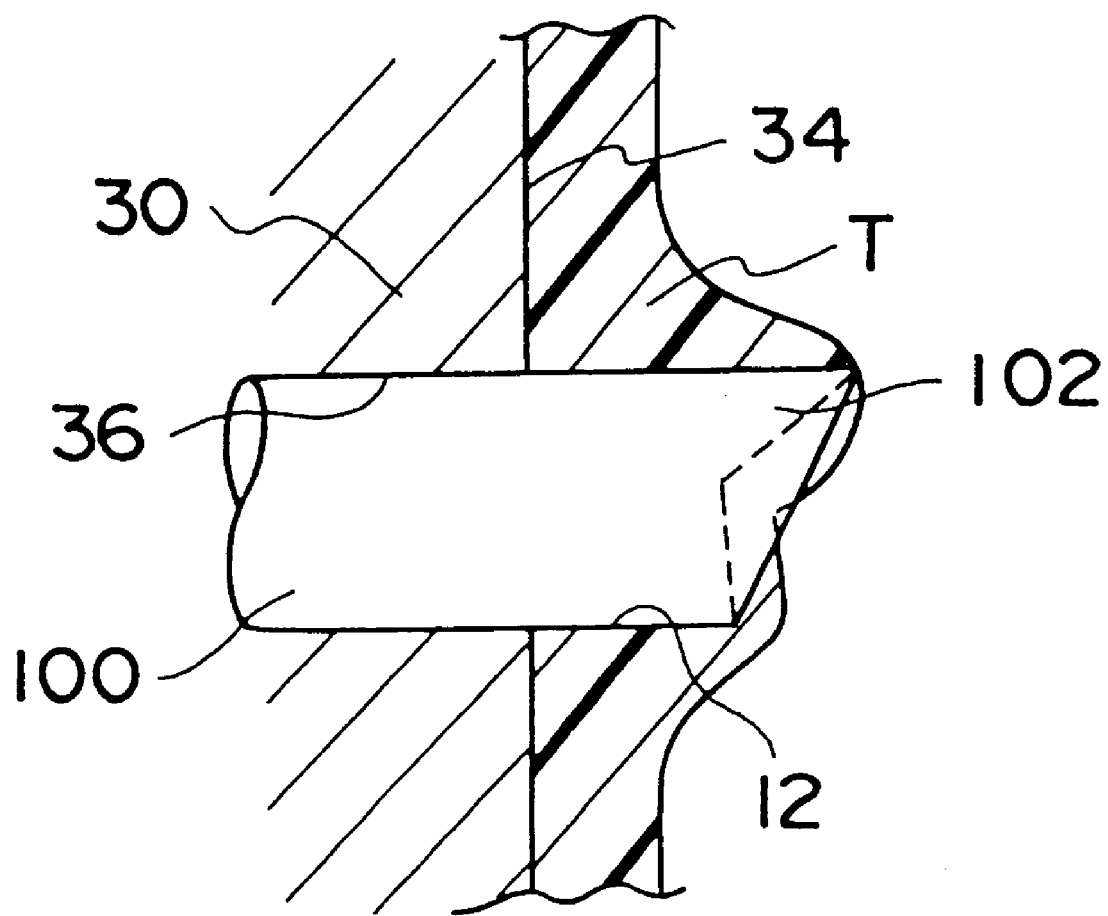
FIG. 24 is a cross-sectional view which shows a principal process of a method of manufacturing a resinous tank relating to a seventh embodiment of the present invention in a state in which a resin cavity is pressed and adhered to a molding surface.
Figure 25:
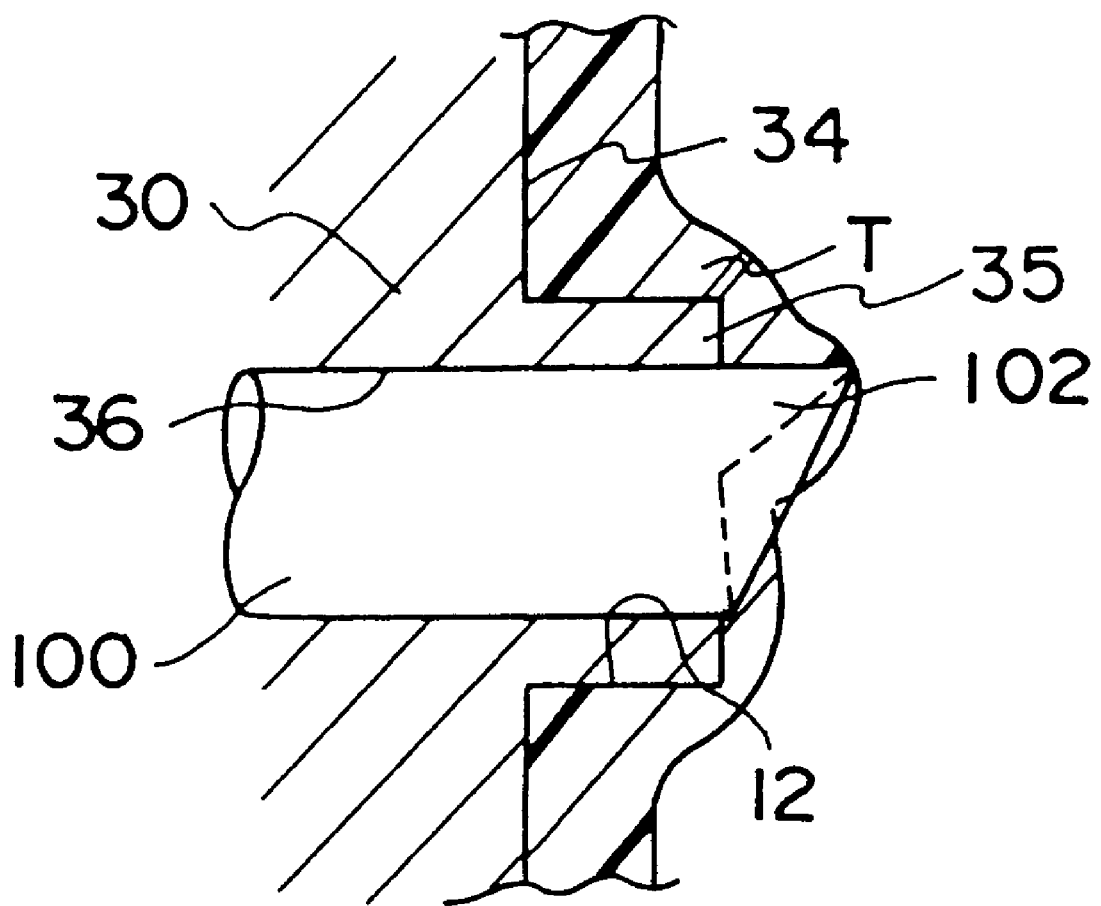
FIG. 25 is a cross-sectional view which shows a principal process of a method of manufacturing a resinous tank relating to an eighth embodiment of the present invention in a state in which a resin cavity is pressed and adhered to a molding surface.
Figure 26:
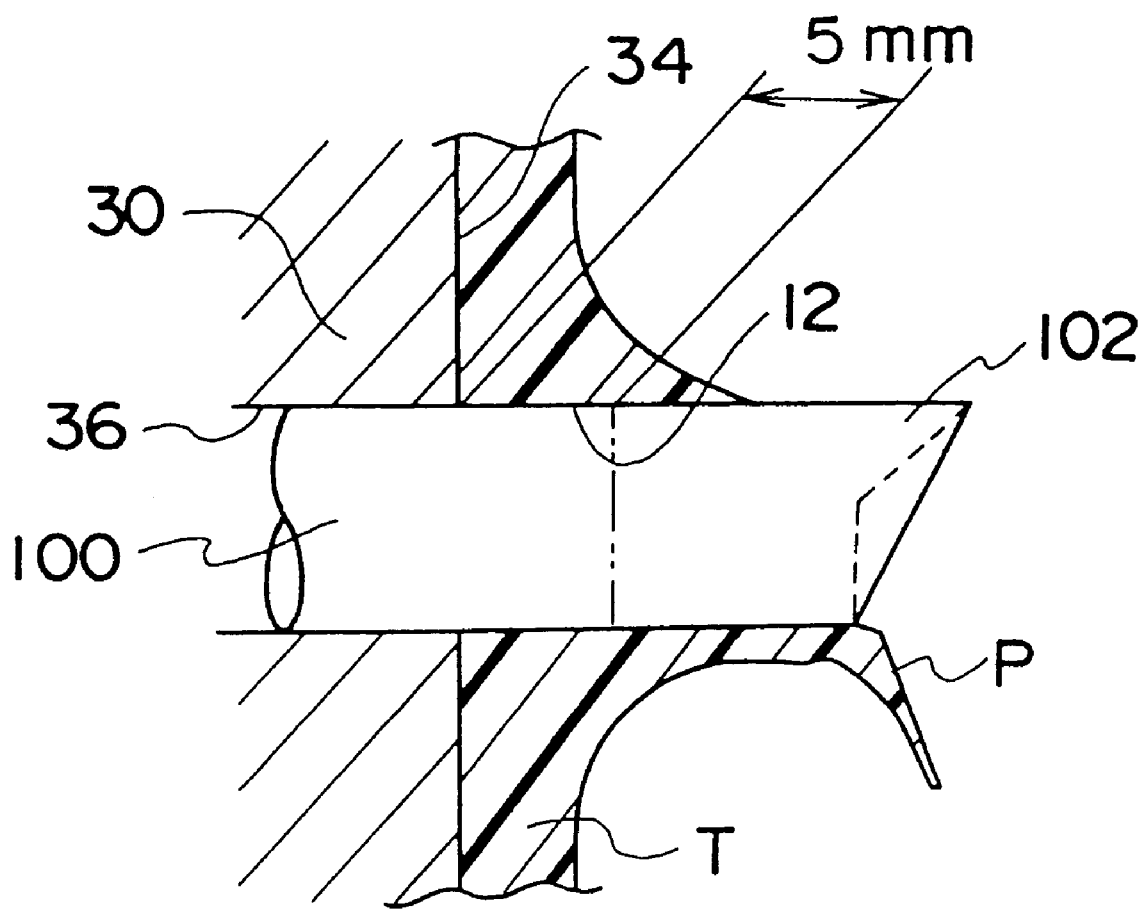
FIG. 26 is a cross-sectional view which shows the principal process of the method of manufacturing a resinous tank relating to the seventh embodiment of the present invention in a state in which a resin parison corresponding to the through-hole of a hollow body is cut out.
Figure 27:
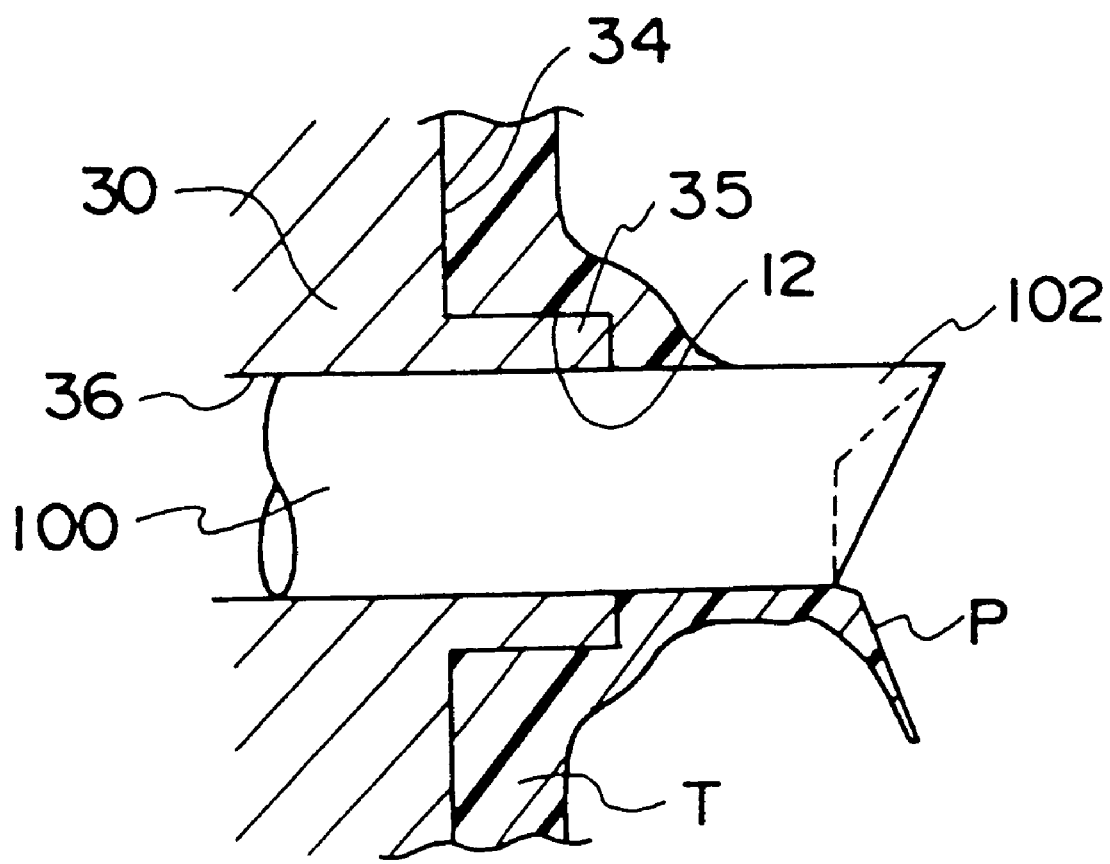
FIG. 27 is a cross-sectional view which shows the principal process of the method of manufacturing a resinous tank relating to the eighth embodiment of the present invention in a state in which a resin parison corresponding to the through-hole of a hollow body is cut out.
Figure 28:
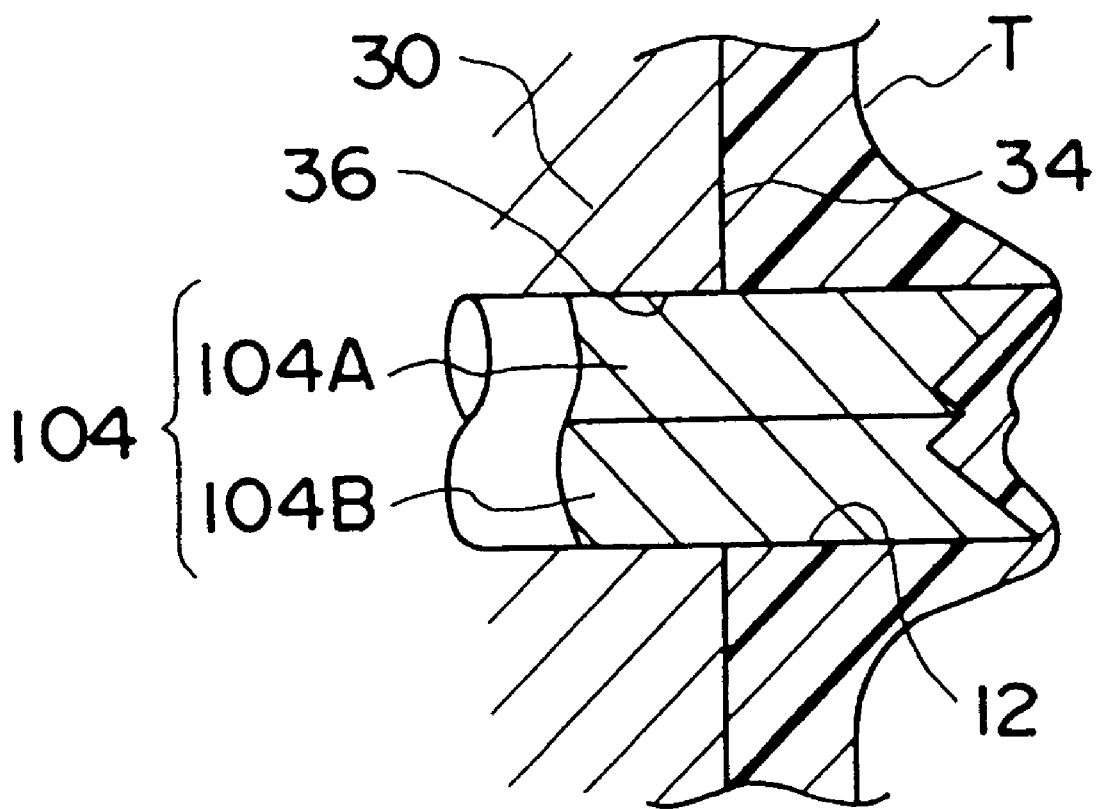
FIG. 28 is a cross-sectional view which shows a principal process of a method of manufacturing a resinous tank relating to a variant example of the seventh embodiment of the present invention in a state in which a resin cavity is pressed and adhered to a molding surface.
Figure 29:
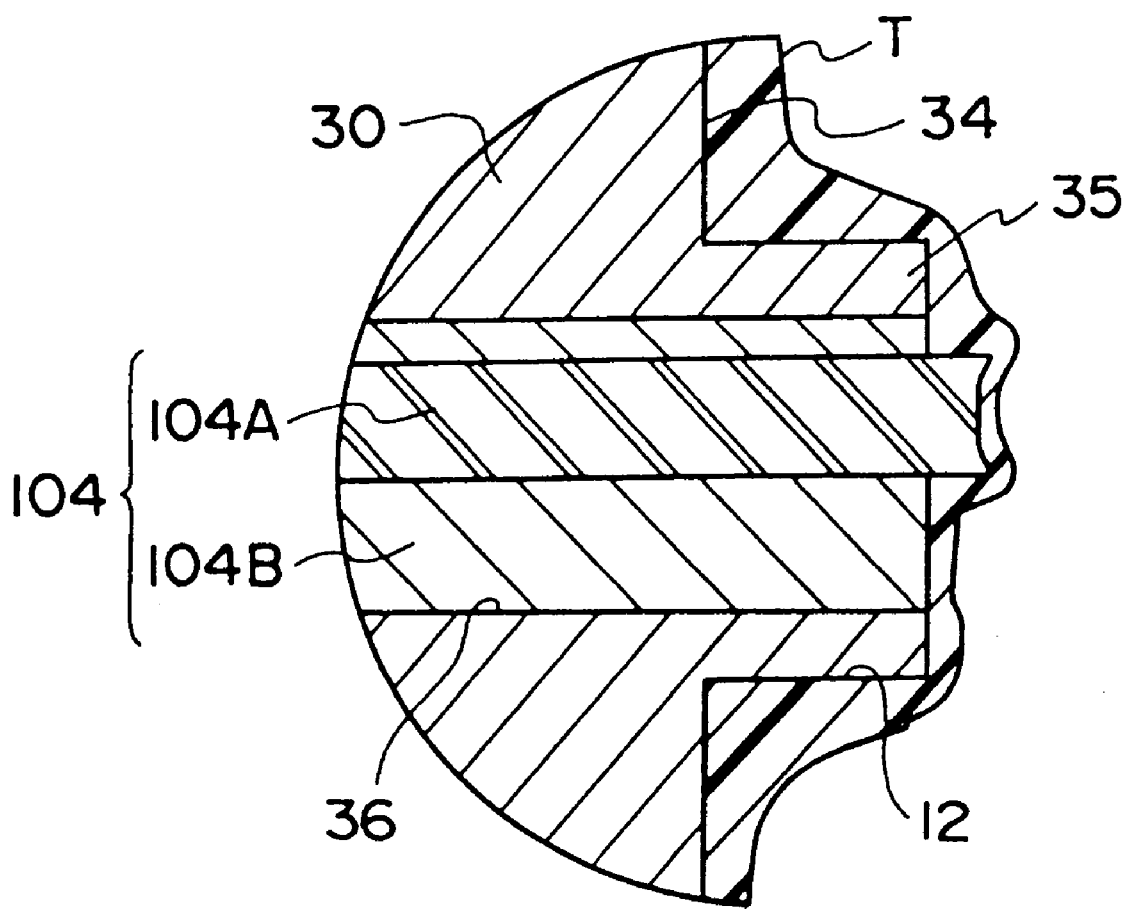
FIG. 29 is a cross-sectional view which shows a principal process of a method of manufacturing a resinous tank relating to a variant example of the eighth embodiment of the present invention in a state in which a resin cavity is pressed and adhered to a molding surface.
Figure 30:
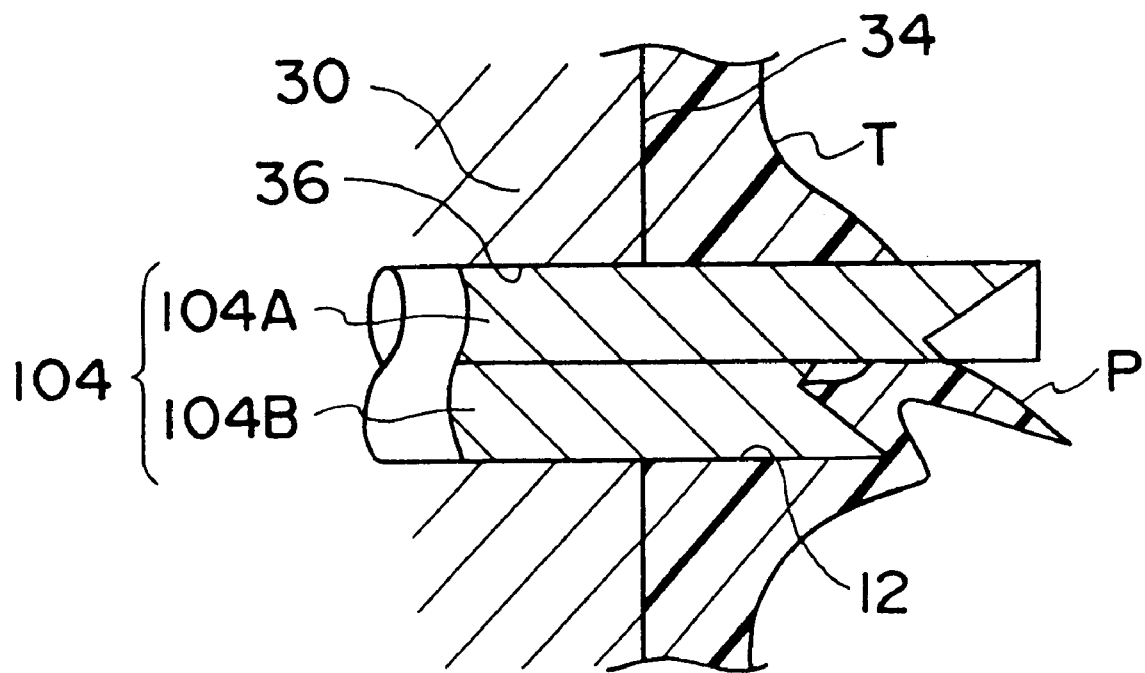
FIG. 30 is a cross-sectional view which shows the principal process of the method of manufacturing a resinous tank relating to the variant example of the seventh embodiment of the present invention in a state in which a resin parison corresponding to the through-hole of a hollow body is cut out.
Figure 31:
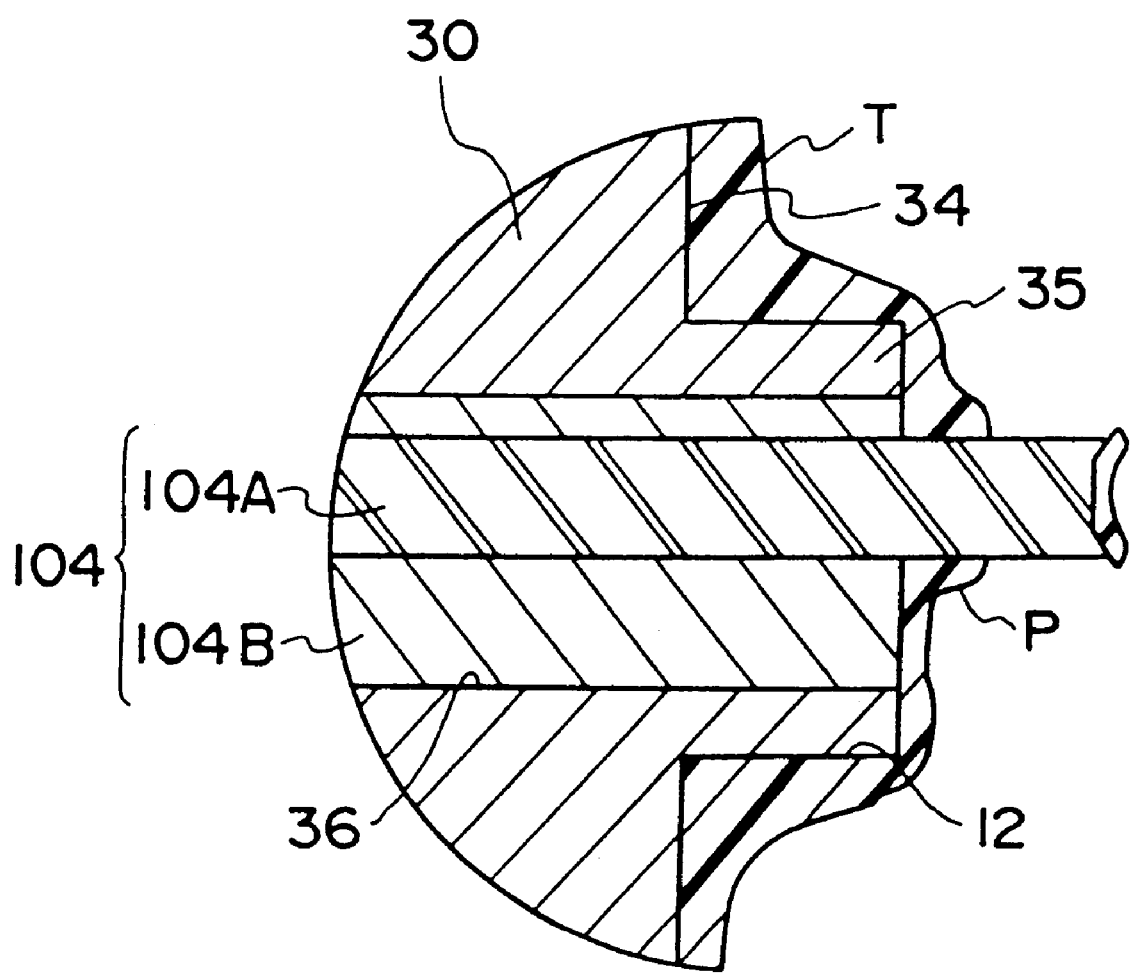
FIG. 31 is a cross-sectional view which shows the principal process of the method of manufacturing a resinous tank relating to the variant example of the eighth embodiment of the present invention in a state in which a resin parison corresponding to the through-hole of a hollow body is cut out.

Next, FIGS. 24 and 26 is a cross-sectional view which shows a principal process of a method of manufacturing a resinous tank relating to a seventh embodiment of the present invention. FIGS. 25 and 27 is a cross-sectional view which shows a principal process of a method of manufacturing a resinous tank relating to an eighth embodiment of the present invention.

In the method of manufacturing a resinous tank relating to the seventh and eighth embodiments, a tool 100 with a blade (hereinafter, "tool 100") is used instead of the tool 38 in the aforementioned first and second embodiments. An edge portion 102 is formed at the distal end of the tool 100. The edge portion 102 is inclined in a conical shape from the upper side to the lower side (the shape in which only the upper portion is pointed). When the tool 100 is advanced and the resin parison of the hollow body T corresponding to the edge portion 102 is cut out, only the upper portion of the resin parison is cut out and the lower portion thereof, i.e., an uncut parison piece P, remains.

In the seventh embodiment as well, when the washer tank 10 is molded, the tool 100 is provided beforehand so as to protrude further inwardly than the molding surface of the molding die 30.

In the method of manufacturing a resinous tank relating to the seventh and eighth embodiments, the washer tank 10 is basically molded through the same process as the process shown in FIG. 7. However, when the cylinder 44 is operated and the tool 100 is advanced in the inner direction of the hollow body T (segmental molding dies 30 and 32) in step 108, as shown in FIGS. 26 and 27, only the upper portion of the resin parison of the hollow body T corresponding to the edge portion 102 of the tool 100 is cut out, and the lower portion of the resin parison is not cut out and is bent in the bottom direction of the hollow body T due to the advancement of the tool 100. In this state, in step 110, the tool 100 is held in its moved state and the hollow body T and the parison piece P are cooled and solidified. The through-hole 12 is thereby formed.

In this way, even in the method of manufacturing a resinous tank relating to the seventh and eighth embodiments, the seal surface which is necessary for adhering a grommet 20 can be guaranteed. For example, as shown in FIG. 26, if the surface roughness of the inner circumferential wall surface of the through-hole 12 within 5 mm of the molding surface of the molding die 30 is good, the seal surface can be guaranteed.

Moreover, in the method of manufacturing a resinous tank relating to the seventh and eighth embodiments, the parison piece P, at which the through-hole 12 is formed, is held and does not drop and remain inside the hollow body T. Accordingly, there is no need to take out the remaining parison piece P later after the segmental molding dies 30 and 32 are opened and the hollow body T is taken out. The process and cost can be reduced.

Further, in the method of manufacturing a resinous tank relating to the seventh and eighth embodiments, when the manufactured washer tank 10 is actually used, a superior effect is achieved in that a foreign object such as waste or the like remained at the bottom portion of the washer tank 10 is prevented from entering the through-hole 12 by parison piece P (in other words, the parison piece P becomes a wall for preventing the entering of a foreign object). Accordingly, breakage or the like of a pump 16 caused by the entering of a foreign object can be prevented in advance and the manufacturing method is even more effective.

In the seventh and eighth embodiments, as the edge portion 102 of the tool 100 is inclined in the conical shape from the upper side to the lower side (the shape in which only the upper portion is pointed), only the upper portion of the resin parison is cut out and the lower portion thereof, i.e., the uncut parison piece P, remains. However, the shape (structure) of the tool 100 for cutting so that the uncut parison piece P remains at the time of forming the through-hole 12 is not limited to this.

For example, as shown in FIGS. 28 through 31, a tool 104 with a blade (hereinafter, "tool 104") may be formed by an upper edge portion 104A and a lower main body portion 104B. In the tool 104, only the upper edge portion 104A advances in the inner direction of the hollow body T (the segmental molding dies 30 and 32).

Using the tool 104, due to the advancement of the upper edge portion 104A only, the lower portion of the resin parison of the hollow body T corresponding to the tool 104 is not cut and only the upper portion of the resin parison is cut. In this way, in the same manner as described above, the through-hole 12 and the parison piece P are formed. In the seventh embodiment, the lower portion of the resin parison is bent in the bottom direction of the hollow body T due to the advancement of the upper edge portion 104A.

Even in this case, a seal surface which is necessary for adhering a grommet 20 can be guaranteed. Further, because the parison piece P with the formed through-hole 12 is held and does not drop and remain inside the hollow body T, there is no need to take out the remaining parison piece P later after the segmental molding dies 30 and 32 are opened and the hollow body T is taken out. The processes and the cost are thereby reduced.

Moreover, when the manufactured washer tank 10 is actually used, a superior effect is achieved in that foreign objects such as waste which remain at the bottom portion of the washer tank 10 can be prevented from entering the through-hole 12 (in other words, the parison piece P becomes a wall for preventing the entering of a foreign object). Accordingly, for example, breakage or the like of the pump 16 caused by the entering of a foreign object can be prevented beforehand and the method is even more effective.

Figure 32:
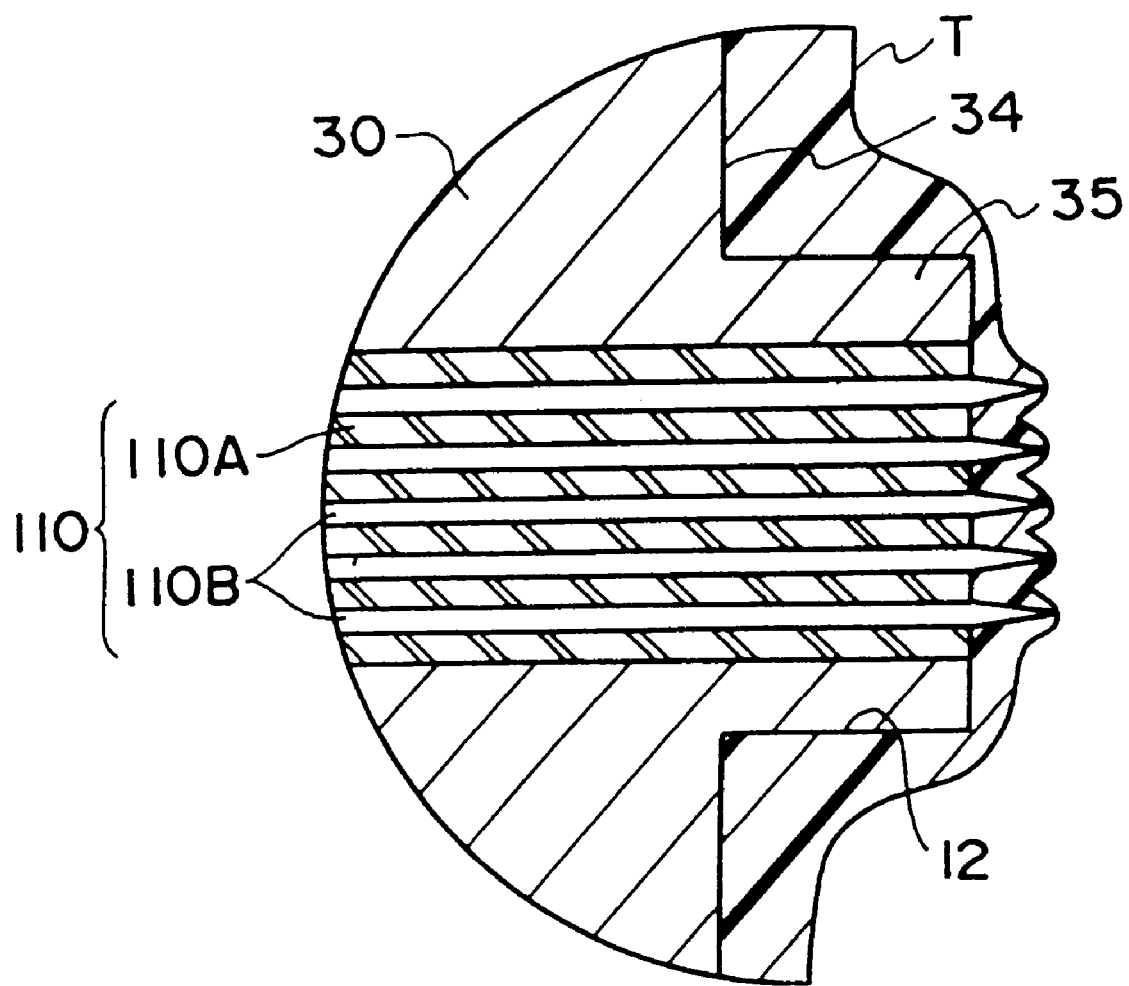
FIG. 32 is a cross-sectional view which shows a principal process of a method of manufacturing a resinous tank relating to a ninth embodiment of the present invention.

Next, FIG. 32 is a cross-sectional view which shows a principal process of a method of manufacturing a resinous tank relating to a ninth embodiment of the present invention.

In the method of manufacturing a resinous tank relating to the ninth embodiment, a tool 110 with a blade (hereinafter, "tool 110") is used instead of the tool 38 in the aforementioned second embodiment. The tool 110 is formed by a main body portion 110A and a plurality of needle portions 110B, which are held at the main body portion 110A so as to be relatively movable. In the tool 110, only the plurality of needle portions 110B are advanced in the inner direction of a hollow body T (segmental molding dies 30 and 32).

In the method of manufacturing a resinous tank relating to the ninth embodiment, the washer tank 10 is basically molded through the same process as the process shown in FIG. 7. However, when the cylinder 44 is operated and the tool 110 is advanced in the inner direction of the hollow body T (the segmental molding dies 30 and 32), only the resin parison of the hollow body T corresponding to the needle portions 110B of the tool 110 is cut out. Accordingly, the hollow body T is cooled and solidified after the operation of the tool 110, and thereafter, a plurality of holes are formed at the parison piece P in the mesh shape. In this way, as shown in FIGS. 33A and 33B, in the washer tank 10, a meshed filter portion 112 is integrally formed at the through-hole 12 and the washer tank 10 is formed completely.

In the method of manufacturing a resinous tank relating to the ninth embodiment, the seal surface which is necessary for adhering the grommet 20 can be guaranteed and also the meshed filter portion 112 is integrally formed at the through-hole 12. Consequently, when the manufactured washer tank 10 is actually used, a superior effect is achieved in that a foreign object such as waste which remains in the bottom portion of the washer tank 10 can be prevented from entering the through-hole 12. Accordingly, for example, the breakage or the like of the pump 16 caused by the entering of a foreign object can be prevented beforehand, and further, there is no need to provide another new filter at the end portion of the grommet 88.

In the ninth embodiment, the number and size (i.e., the size of meshes of the filter portion 112) of the needle portions 110B of the tool 110 can be set arbitrarily and may be determined in accordance with a foreign object to be a subject.

Figure 34:
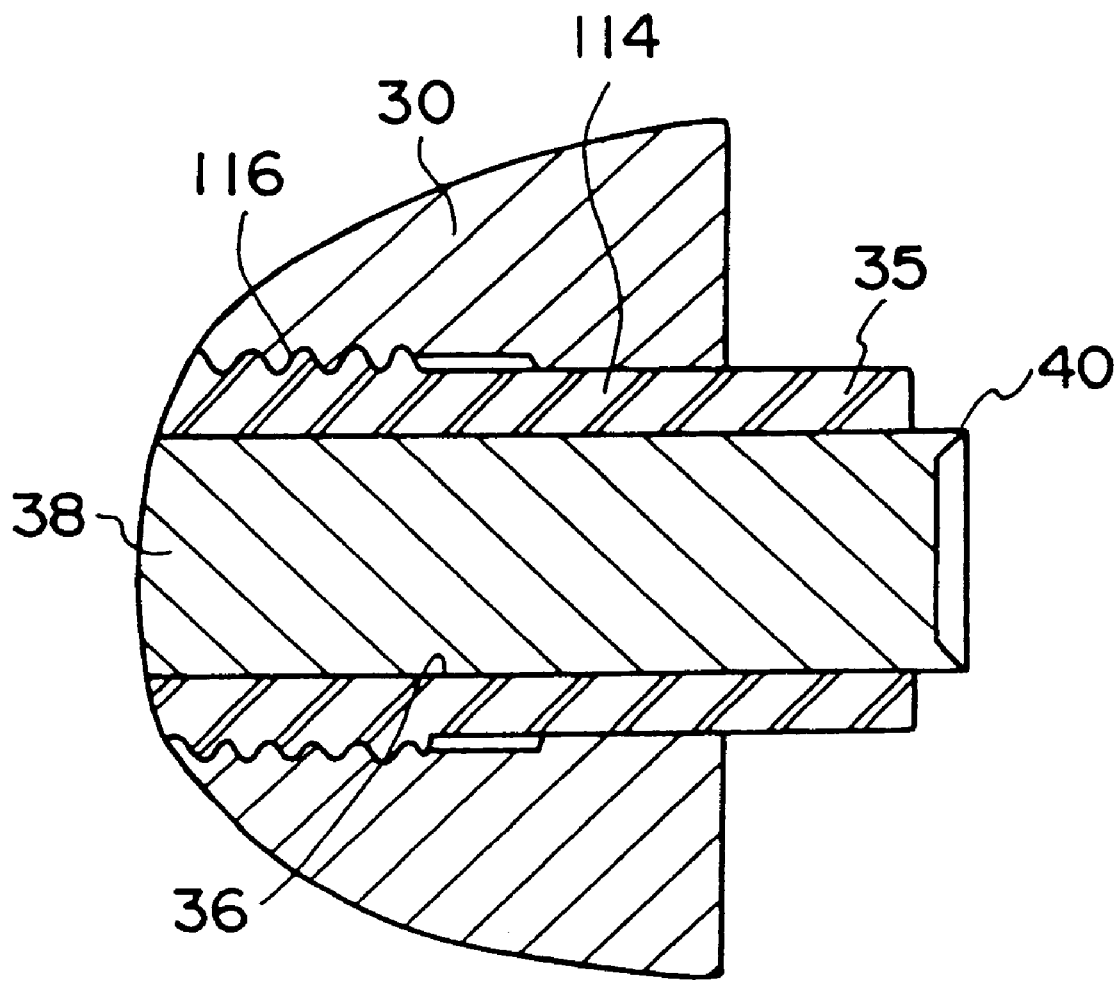
FIG. 34 is a cross-sectional view which shows a principal process of a method of manufacturing a resinous tank relating to a tenth embodiment of the present invention.

FIG. 34 is a cross-sectional view which shows a principal process of a method of manufacturing a resinous tank relating to a tenth embodiment of the present invention.

In the method of manufacturing a resinous tank relating to the tenth embodiment, an auxiliary die 114 is attached to a segmental molding die 30. A screw portion 116 is provided at the outer circumference of the auxiliary die 114. As the screw portion 116 is screwed to the molding die 30, the distal end portion of the screw portion 116 protrudes further inwardly than the general molding surface of the molding die 30 and is provided integrally with the molding die 30. The distal end protruding portion of the auxiliary die 114 corresponds to the aforementioned convex portion 35. Moreover, the auxiliary die 114 can change the amount of protrusion of the protruding distal end portion (the convex portion 35) by changing the screwed state of the screw portion 116 and moving the screw portion 116 in the axial direction. Similar to the aforementioned embodiments, a tool hole 36 is formed and a tool 38 with a blade or the like is disposed within the auxiliary die 114.

In the method of manufacturing a resinous tank relating to the tenth embodiment as well, a washer tank 10 is molded through the same process as the process shown in FIG. 7. Namely, the resin prison is expanded within the segmental molding dies 30 and 32 and adhered to the circumferential wall of the protruding distal end portion (the convex portion 35) of the auxiliary die 114. The through-hole 12 of the washer tank 10 is formed. In this case as well, because the inner circumferential wall surface of the through-hole 12 is not a cut surface and is formed in accordance with the circumferential wall of the protruding distal end portion of the auxiliary die 114 (because the circumferential wall of the protruding distal end portion of the auxiliary die 114 is the inner circumferential wall surface of the through-hole 12), the surface roughness of the inner circumferential wall portion (the seal surface) can be good (the necessary surface roughness can be guaranteed). Therefore, the sealability of the through-hole 12 can be guaranteed.

Still further, in the method of manufacturing a resinous tank relating to the tenth embodiment, the auxiliary die 114 forming the convex portion 35 is provided at the molding die 30 by the screw portion 116 and can change the amount of protrusion of the protruding distal end portion (the convex portion 35) by changing the screwed state of the screw portion 116 and moving the screw portion 116 in the axial direction. Accordingly, the dimension of the inner circumferential wall portion (the seal surface) of the through-hole 12 can be set arbitrarily. Therefore, the through-hole 12 which has a dimension based on the matching part attached to the through-hole 12 can be formed and the range of application greatly increases.

Figure 35:
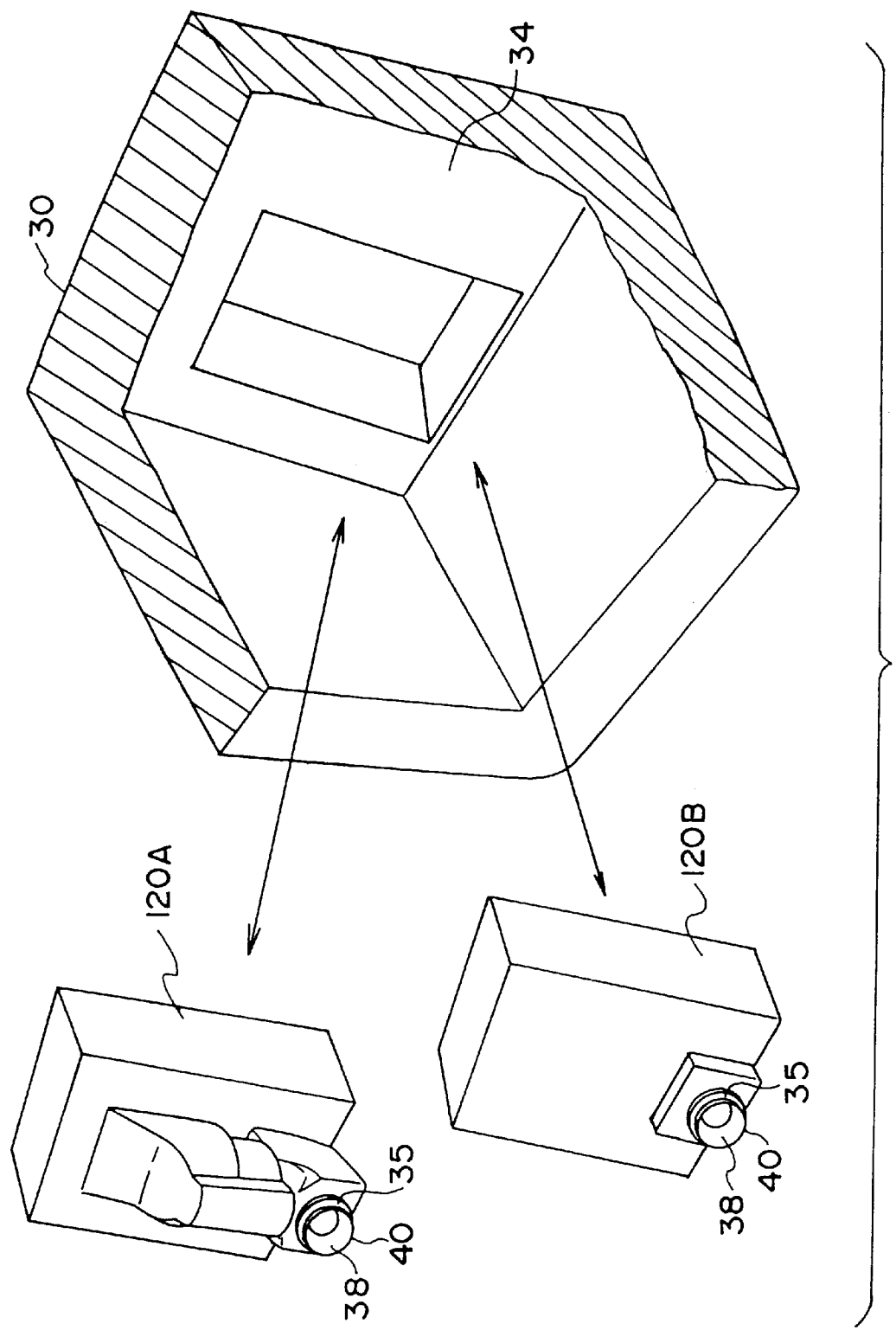
FIG. 35 is a perspective view which shows a principal process of a method of manufacturing a resinous tank relating to an eleventh embodiment of the present invention.
Figure 36:
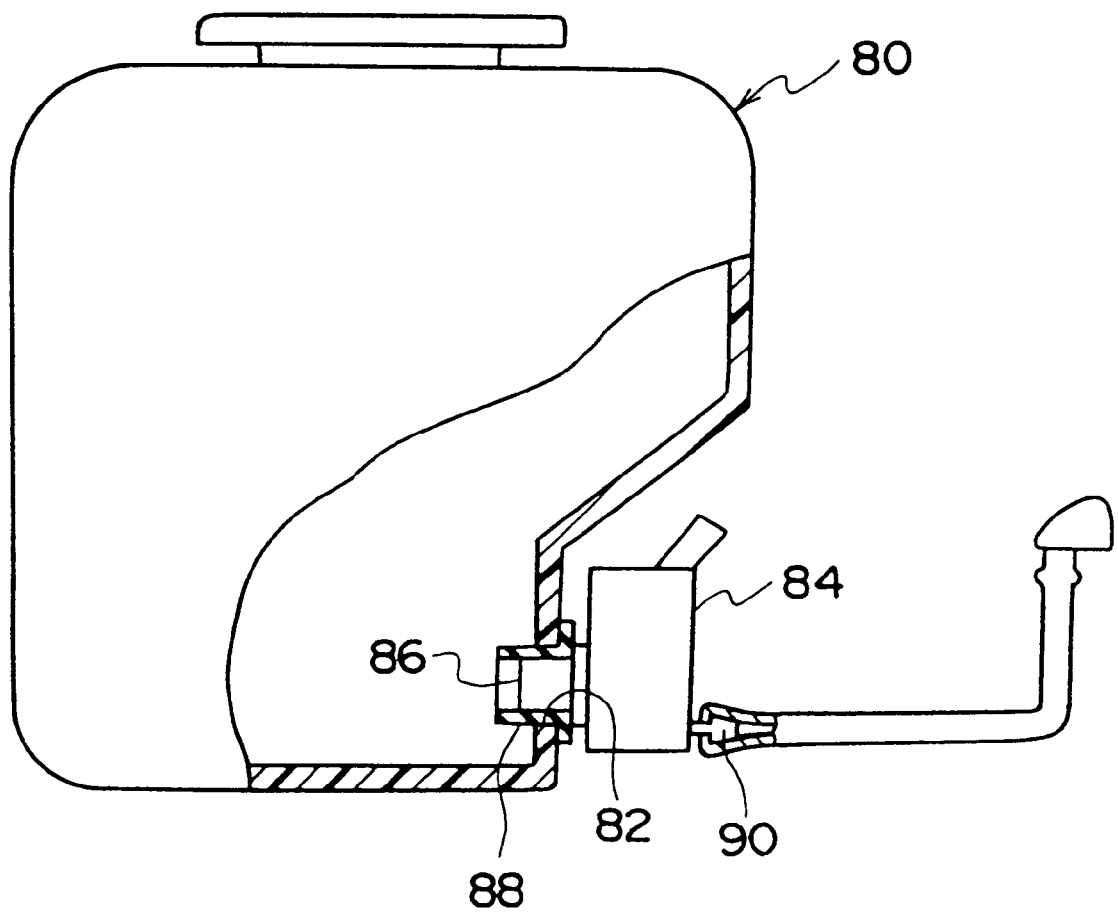
FIG. 36 is an elevational and partially broken view of a washer tank which is manufactured through ordinary blow molding.

FIG. 35 is a perspective view which shows a principal process of a method of manufacturing a resinous tank relating to an eleventh embodiment of the present invention.

In the method of manufacturing a resinous tank relating to the eleventh embodiment, the peripheral portion including the aforementioned convex portion 35 is formed as an insert die 120A, an insert die 120B, . . . , and an insert die 120N. Namely, a plurality of types of insert dies 120A, 120B, . . . , and 120N are set so as to correspond to the one which has different diameter dimension of the convex portion 35 (the through-hole 12), different protruding dimension thereof (the dimension of the seal surface of the inner circumferential wall portion of the through-hole 12), or the like. The insert dies are replaced (exchanged) and used properly.

In the method of manufacturing a resinous tank relating to the eleventh embodiment as well, a washer tank 10 is molded through the same process as the process shown in FIG. 7. Namely, as the resin parison is expanded within the segmental molding dies 30 and 32 and adhered to the circumferential wall of the convex portion 35, the through-hole 12 of the washer tank 10 is formed.

In this, case, in the method of manufacturing a resinous tank relating to the eleventh embodiment, since the plurality of types of insert dies 120A, 120B, or the like are set so as to correspond to the one which has different diameter dimension of the convex portion 35 (the through-hole 12), different protruding dimension thereof (the dimension of the seal surface of the inner circumferential wall portion of the through-hole 12), or the like, if these insert dies 120A, 120B, or the like are replaced (exchanged) and used properly, the through-hole 12 having an optimal diameter can be formed and the range of application greatly increases.

In the method of manufacturing a resinous tank relating to the twelfth embodiment, the blade is concave-shaped which forms an acute angle from the axis of the through-hole to the inner wall surface thereof. The blade protrudes further inwardly than the thickness of the general portion of the pressed resin parison so that the thickness of the resin parison on the blade is further reduced and stress concentrates at the blade. Accordingly, it is easy to cut out the portion of the resin parison hollow body.

In the method of manufacturing a resinous tank relating to the thirteenth embodiment, the blade is convex-shaped. The blade protrudes further inwardly than the thickness of the general portion of the pressed resin parison so that the thickness of the resin parison on the blade is further reduced. Accordingly, it is easy to cut out the portion of the resin parison hollow body.

The cross-sectional shape and the size of the edge portion 40 or the like of the tool 38 in the aforementioned embodiments can be changed arbitrarily. If the shape or the size of the edge portion 40 or the like is changed as occasion demands, the through-hole 12 can be circular, angular, elliptical, or the like.

In the aforementioned embodiments, the tool hole 36 (the tools 38, 48, 58, 64, 70, 100, and 104) or the convex portion 35 (the tool hole 36) is provided in the vicinity of the molding die 30 corresponding to the pump fitting portion 14 of the washer tank 10 (the hollow body T) (in other words, the through-hole 12 is molded in the vicinity of the pump fitting portion 14 (the undercut portion)). However, the molding position of the through-hole 12 (i.e., the forming position of the tool hole 36 or the convex portion 35) is not limited to this. For example, the tool hole 36 (the tool 38, 48, 58, 64, 70, 100, or 104) or the convex portion 35 (the tool hole 36) may be provided in the vicinity positions A (see FIG. 1) of the die-matching portion (parting line) 33 of the pair of segmental molding dies 30 and 32 other than the cavity 34 (the molding surface which molds the hollow body T) so as to mold the through-hole 12.

In this case, in the die-matching portion (the parting line) 33 of the segmental molding dies 30 and 32 other than the cavity 34 (the molding surface which molds the hollow body T), the resin parison (the portion of the resin parison other than the one used for forming the washer tank 10) is nipped and held. Accordingly, when the tool 38 or the like is advanced in the inner direction of the hollow body T so as to cut out the resin parison of the hollow body T and form the through-hole 12, the hollow body T (the general portion of the resin parison) is not shifted or moved unnecessarily due to the movement of the tool 38 or the like and the resin parison corresponding to the through-hole 12 can be reliably cut out. As a result, the product accuracy of the washer tank 10 further improves.

Furthermore, in the aforementioned embodiments, the tool 38 or the like is moved by the cylinder 44. However, the structure for moving the tool 38 or the like is not limited to this. The tool 38 or the like may be moved using, for example, a cam mechanism, a motor, an electromagnet, or the like.

What is claimed is:

1. A method of manufacturing a resinous tank having a through-hole in a side wall portion of the tank, comprising:

providing a pair of cooperating molding dies forming a cavity therebetween;

providing a tool with a blade at one of the molding dies such that a portion of said tool protrudes further inwardly into the cavity than the molding surface of the one of the molding dies and a thickness of a resin parison to be formed, said tool being columnar and the blade being located at a distal end of said tool;

forming a hollow tank body by expanding said resin parison within the cavity, such that said resin parison is pressed against inner wall surfaces of said molding dies, and brought into close contact with the outer peripheral wall of said tool, such that the outer peripheral wall of said tool forms an inner wall surface of said through-hole, wherein the length of the portion of said tool protruding into the cavity is more than the thickness of said pressed resin parison;

completing formation of said through-hole by advancing said tool further into said hollow body, and cutting out a portion of said resin parison hollow body corresponding to the blade of said tool; and removing said tool from said hollow body, opening said molding dies, and removing said tank, wherein the tank's hollow body has said through-hole formed in a side wall portion thereof.

2. A method of manufacturing a resinous tank according to claim 1, further comprising, when a portion of the resin parison hollow body which portion corresponds to the blade is cut out by the blade having the blade of said tool retain the cut-out portion; and removing said cut-out portion along with said tool when said tool is removed from said hollow body.

3. A method of manufacturing a resinous tank according to claim 2, wherein one of the dies includes a tool hole for receiving said tool.

4. A method of manufacturing a resinous tank according to claim 3, wherein the cavity of said molding dies is formed such that an undercut portion is molded in said hollow body, and said tool is provided adjacent the region for forming the undercut portion.

5. A method of manufacturing a resinous tank according to claim 2, wherein the cavity of said molding dies is formed such that an undercut portion is molded at said hollow body, and said tool is provided adjacent the region for forming the undercut portion.

6. A method of manufacturing a resinous tank according to claim 1, wherein one of the dies includes a tool hole for receiving said tool.

7. A method of manufacturing a resinous tank according to claim 6, wherein the cavity of said molding dies is formed such that an undercut portion is molded in said hollow body, and said tool is provided adjacent the region for forming the undercut portion.

8. A method of manufacturing a resinous tank according to claim 1, wherein the cavity of said molding dies is formed such that an undercut portion is molded at said hollow body, and said tool is provided adjacent the region for forming the undercut portion.

9. A method of manufacturing a resinous tank according to claim 1, wherein the blade of said tool is concave-shaped or convex-shaped.

10. A method of manufacturing a resinous tank according to claim 1, wherein the blade of said tool is convex-shaped.

11. A method of manufacturing a resinous tank having a through-hole in a side wall portion of the tank, comprising:

providing a pair of cooperating molding dies forming a cavity therebetween;

providing a projection on one of the molding dies such that the projection extends further inwardly into the cavity than the molding surface of the one of the molding dies and a thickness of a hollow body to be formed;

providing a tool with a blade, said tool being columnar and the blade being located at the distal end of said tool within said projection;

forming a hollow tank body by expanding a resin parison within the cavity such that said resin parison is pressed against the inner wall surfaces of said molding dies and brought into close contact with a peripheral wall of said projection and molding the inner wall surface of said through-hole by the peripheral wall of said projection;

completing formation of said through-hole by advancing said tool further into said hollow body and cutting out a portion of said resin parison hollow body corresponding to the blade of said tool; and removing said tool from said hollow body, opening said molding dies, and removing said tank, wherein the tank's hollow body has said through-hole formed in a side wall portion thereof.

12. A method of manufacturing a resinous tank according to claim 11, wherein a heater cooperates with the blade of said tool, and when a portion of said resin parison hollow body corresponding to the blade is cut out by said blade, the portion is melted by said heater while being cut.

13. A method of manufacturing a resinous tank according to claim 11, wherein one of the dies includes a tool hole for receiving said tool.

14. A method of manufacturing a resinous tank according to claim 13, wherein the cavity of said molding dies is formed such that an undercut portion is molded in said hollow body, and said projection is provided adjacent the region for forming the undercut portion.

15. A method of manufacturing a resinous tank according to claim 12, wherein the cavity of said molding dies is formed such that an undercut portion is molded in said hollow body, and said projection is provided adjacent the region for forming the undercut portion.

16. A method of manufacturing a resinous tank according to claim 11, further comprising, when a portion of the resin parison hollow body which portion corresponds to the blade is cut out by the blade, having the blade of said tool retain the cut-out portion; and removing said cut-out portion along with said tool when said tool is removed from said hollow body.

17. A method of manufacturing a resinous tank according to claim 16, wherein one of the dies includes a tool hole for receiving said tool.

18. A method of manufacturing a resinous tank according to claim 17, wherein the cavity of said molding dies is formed such that an undercut portion is molded in said hollow body, and said projection is provided adjacent the region for forming the undercut portion.

19. A method of manufacturing a resinous tank according to claim 16, wherein the cavity of said molding dies is formed such that an undercut portion is molded in said hollow body, and said projection is provided adjacent the region for forming the undercut portion.

20. A method of manufacturing a resinous tank according to claim 11, wherein one of the dies includes a tool hole for receiving said tool.

21. A method of manufacturing a resinous tank according to claim 20, wherein the cavity of said molding dies is formed such that an undercut portion is molded in said hollow body, and said projection is provided adjacent the region for forming the undercut portion.

22. A method of manufacturing a resinous tank according to claim 11, wherein the cavity of said molding dies is formed such that an undercut portion is molded in said hollow body, and said projection is provided adjacent the region for forming the undercut portion.

23. A method of manufacturing a resinous tank according to claim 11, wherein the length of a portion of said tool protruding further inwardly than the molding surface of one of said molding dies is equal to or more than the thickness of said pressed resin parison.

24. A method of manufacturing a resinous tank according to claim 23, wherein the blade of said tool is concave-shaped or convex-shaped.

25. A method of manufacturing a resinous tank according to claim 11, wherein the blade of said tool is convex-shaped.

26. A method of manufacturing a washer tank having a through-hole in a side wall portion of the tank, comprising:

providing a pair of cooperating molding dies forming a cavity therebetween;

providing a tool with a blade at one of the molding dies such that a portion of said tool extends further inwardly into the cavity than the molding surface of the one of the molding dies, and a thickness of a resin parison to be formed, said tool being columnar and the blade being located at a distal end of said tool;

forming a hollow tank body by expanding said resin parison within the cavity, such that said resin parison is pressed against inner wall surfaces of said molding dies, and brought into close contact with the outer peripheral wall of said tool, extending the blade of said tool further inwardly than the thickness of said pressed resin parison such that the outer peripheral wall of said tool forms an inner wall surface of said through-hole, wherein the length of the portion of said tool protruding into the cavity is more than the thickness of said pressed resin parison;

completing formation of said through-hole by advancing said tool further into said hollow body, and cutting out a portion of said resin parison hollow body corresponding to the blade of said tool;

removing said tool from said hollow body, opening said molding dies, and removing said tank, wherein the tank's hollow body has said through-hole formed in a side wall portion thereof; and providing a pump having a grommet around an inlet thereof arranged by fitting the outer peripheral wall of said grommet into said through-hole.

27. A method of manufacturing a washer tank having a through-hole provided at a side wall portion of the tank according to claim 26, wherein said pump is provided on an undercut portion.

28. A method of manufacturing a washer tank having a through-hole in a side wall portion of the tank, comprising:

providing a pair of cooperating molding dies forming a cavity therebetween;

providing a projection at one of the molding dies such that the projection extends further inwardly than the molding surface of the one of the molding dies and a thickness of a hollow body to be formed;

providing a tool with a blade, said tool being columnar and the blade being located at the distal end of said tool within said projection;

forming a hollow tank body by expanding a resin parison within the cavity such that said resin parison is pressed against the inner wall surfaces of said molding dies and brought into close contact with a peripheral wall of said projection, and molding the inner wall surface of said through-hole by the peripheral wall of said projection;

completing formation of said through-hole by advancing said tool further into said hollow body and cutting out a portion of said resin parison hollow body corresponding to the blade of said tool;

removing said tool from said hollow body, opening said molding dies, and removing said tank, wherein the tank's hollow body includes said through-hole; and providing a pump having a grommet around an inlet thereof arranged by fitting the outer peripheral wall of said grommet into said through-hole.

29. A method of manufacturing a washer tank having a through-hole provided at a side wall portion of the tank according to claim 28, wherein said pump is provided on an undercut portion.

* * * * *